United States Patent
Han et al.

(10) Patent No.: US 12,015,949 B2
(45) Date of Patent: Jun. 18, 2024

(54) QOS FLOW PROCESSING METHOD AND DEVICE, AND COMMUNICATIONS SYSTEM

(71) Applicant: HUAWEI TECHNOLOGIES CO., LTD., Guangdong (CN)

(72) Inventors: Lifeng Han, Shenzhen (CN); Qinghai Zeng, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/530,025

(22) Filed: Aug. 2, 2019

(65) Prior Publication Data

US 2019/0357076 A1 Nov. 21, 2019

Related U.S. Application Data

(63) Continuation of application No. PCT/CN2018/075245, filed on Feb. 5, 2018.

(30) Foreign Application Priority Data

Feb. 3, 2017 (CN) .......................... 201710063757.9

(51) Int. Cl.
*H04W 28/00* (2009.01)
*H04W 28/02* (2009.01)
(Continued)

(52) U.S. Cl.
CPC ... *H04W 28/0967* (2020.05); *H04W 28/0268* (2013.01); *H04W 28/0273* (2013.01); *H04W 76/27* (2018.02); *H04W 80/08* (2013.01)

(58) Field of Classification Search
CPC .. H04W 80/08; H04W 28/0273; H04W 76/27
See application file for complete search history.

(56) References Cited

U.S. PATENT DOCUMENTS 9,253,704 B1    2/2016 Sarkar et al.
2008/0186923 A1* 8/2008 Westphal ............. H04W 28/02
                                                 370/332
(Continued)

FOREIGN PATENT DOCUMENTS

CN    101009907 A    8/2007
CN    101150782 A    3/2008
(Continued)

OTHER PUBLICATIONS

CATT, NR QoS open issues . 3GPP TSG RAN WG2 Meeting #96 Reno, USA, ,Nov. 14-18, 2016, R2-167611, 4 pages.
(Continued)

*Primary Examiner* — Lakeram Jangbahadur
(74) *Attorney, Agent, or Firm* — Fish & Richardson P.C.

(57) ABSTRACT

Embodiments of this application provide a QoS flow processing method and device, and a communications system. A first access network device sends a message used for a service transfer request to a second access network device, and the message used for the service transfer request includes configuration information of a QoS flow in the first access network device, so that the second access network device can configure a mapping relationship from the QoS flow to a DRB of the second access network device for UE based on the configuration information, and accept the QoS flow of the UE. Therefore, in a service transfer process, a reliable QoS service can be provided for a user, and continuity of a user service can be ensured.

16 Claims, 7 Drawing Sheets

(51) Int. Cl.
  *H04W 28/08* (2023.01)
  *H04W 76/27* (2018.01)
  *H04W 80/08* (2009.01)

(56) References Cited

U.S. PATENT DOCUMENTS

| | | | |
|---|---|---|---|
| 2010/0074109 | A1 | 3/2010 | Klingenbrunn et al. |
| 2010/0135253 | A1 | 6/2010 | Lee et al. |
| 2011/0201303 | A1 | 8/2011 | Cutler et al. |
| 2011/0267943 | A1* | 11/2011 | Huang ................ H04W 72/543 370/315 |
| 2012/0198081 | A1 | 8/2012 | Zhao et al. |
| 2012/0287894 | A1 | 11/2012 | Zhou et al. |
| 2013/0329635 | A1 | 12/2013 | Lee et al. |
| 2015/0071059 | A1 | 3/2015 | Fu et al. |
| 2015/0143463 | A1 | 5/2015 | Baghel et al. |
| 2015/0215965 | A1 | 7/2015 | Yamada |
| 2015/0257159 | A1 | 9/2015 | Speicher et al. |
| 2015/0264738 | A1 | 9/2015 | Lee et al. |
| 2016/0338102 | A1 | 11/2016 | Nuggehalli et al. |
| 2017/0303287 | A1* | 10/2017 | Yu ..................... H04W 28/0263 |
| 2018/0213540 | A1* | 7/2018 | Chiu ..................... H04W 72/08 |
| 2020/0015116 | A1* | 1/2020 | Huang ................ H04W 36/00 |
| 2020/0077320 | A1* | 3/2020 | Shimoda ................ H04L 5/001 |
| 2020/0267753 | A1* | 8/2020 | Adjakple ............... H04W 72/14 |

FOREIGN PATENT DOCUMENTS

| | | |
|---|---|---|
| CN | 101409951 A | 4/2009 |
| CN | 101478743 A | 7/2009 |
| CN | 101640895 A | 2/2010 |
| CN | 102291763 A | 12/2011 |
| CN | 102404691 A | 4/2012 |
| CN | 102612095 A | 7/2012 |
| CN | 103404096 A | 11/2013 |
| CN | 104333908 A | 2/2015 |
| CN | 105340324 A | 2/2016 |
| EA | 009262 B1 | 12/2007 |
| EP | 2537392 A1 | 12/2012 |
| EP | 2550835 B1 | 9/2019 |
| RU | 2315436 C2 | 1/2008 |
| RU | 2541929 C2 | 2/2015 |
| WO | 2011101743 A1 | 8/2011 |
| WO | 2013120074 A1 | 8/2013 |

OTHER PUBLICATIONS

CATT, DRB management and NR QoS. 3GPP TSG RAN WG2 Meeting #95bis Kaohsiung, Oct. 10-14, 2016, R2-166113, 5 pages.
Ericsson, QoS framework for NR. 3GPP TSG-RAN WG2 Meeting #96 Reno, Nevada, USA, Nov. 14-18, 2016, R2-168657, 6 pages.
3GPP TS 23.502 V0.1.1, 3rd Generation Partnership Project; Technical Specification Group Services and System Aspects; Procedures for the 5G System;Stage 2;(Release 15), Jan. 2017, 46 pages.
Samsung, Two levels for "QOS flow mobility". 3GPP TSG-RAN WG2 Meeting #96bis Spokane, USA, Jan. 17-19, 2017, R2-1700028, 4 pages.
3GPP TS 36.300 V14.1.0 , 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2(Release 14), Dec. 2016, 317 pages.
Office Action issued in Chinese Application No. 201810907722.3 dated Mar. 27, 2019, 9 pages.
Office Action issued in Chinese Application No. 201810673014.8 dated Apr. 9, 2019, 8 pages.
PCT International Search Report and Written Opinion issued in International Application No. PCT/CN2018/075,245, dated Mar. 30, 2018, 14 pages (With Partial English Translation).
Extended European Search Report issued in European Application No. 18747836.7 dated Dec. 11, 2019, 10 pages.
R2-1700030—Samsung, "NR QOS—AS handling of a New QOS flow," 3GPP TSG-RAN WG2 Meeting #96bis, Spokane, USA, Jan. 17-19, 2017, 4 pages.
Huawei, HiSilicon, "A New Protocol Layer for QoS Flow to DRB Mapping," 3GPP TSG-RAN2 Meeting Ad hoc, R2-1700088;Spokane, Washington, USA, Jan. 17-19, 2017, 5 pages.
Office Action issued in Chinese Application No. 201880009850.4 dated May 11, 2020, 10 pages (with English translation).
Office Action issued in Japanese Application No. 2019-542222 dated Feb. 1, 2021, 9 pages (with English translation).
Samsung, "NR QOS model for UL and DL," 3GPP TSG-RAN WG3#94, R3-162744, Reno, Nevada, USA, Nov. 14-18, 2016, 8 pages.
ZTE, ZTE Microelectronics, "Discussion on the UP architecture for the new QoS framework," 3GPP TSG-RAN WG2 adhoc_2017_01_NR, R2-1700159, Spokane, USA, Jan. 17-19, 2017, 4 pages.
Office Action issued in Russian Application No. 2019127520/07(054017) dated Feb. 11, 2021, 12 pages (with machine translation).
3GPP TS 36.323 V12.4.0 (Jun. 2015), "3rd Generation Partnership Project; Technical Specification Group Radio Access Network; Evolved Universal Terrestrial Radio Access (E-UTRA); Packet Data Convergence Protocol (PDCP) specification(Release 12)," Jun. 2015, 33 pages.
ETSI TS 129 274 V8.2.0 (Jun. 2009), "Universal Mobile Telecommunications System (UMTS); LTE; 3GPP Evolved Packet System (EPS); Evolved General Packet Radio Service (GPRS) Tunnelling Protocol for Control plane (GTPv2-C); Stage 3(3GPP TS 29.274 version 8.2.0 Release 8)," Jun. 2009, 125 pages.
Office Action issued in Chinese Application No. 201880009850.4 dated Oct. 11, 2021, 6 pages.
Ericsson (Rapporteur), "TP on QoS and new protocol layer," 3GPP TSG-RAN WG#2 Ah, R2-1700659, Spokane, Washington, USA, Jan. 17-19, 2017, 3 pages.
Extended European Search Report issued in European Application No. 21194098.6 dated Mar. 11, 2022, 10 pages.
Samsung, "NR + NR DC: QOS Decision Responsibilities," 3GPP TSG-RAN WG2 Meeting #96bis, R2-1700033, Spokane, USA, Jan. 17-19, 2017, 5 pages.

* cited by examiner

QOS FLOW PROCESSING METHOD AND DEVICE, AND COMMUNICATIONS SYSTEM

CROSS-REFERENCE TO RELATED APPLICATIONS

This application is a continuation of International Application No. PCT/CN2018/075245, filed on Feb. 5, 2018 which claims priority to Chinese Patent Application No. 201710063757.9, filed on Feb. 3, 2017. The disclosures of the aforementioned applications are hereby incorporated by reference in their entireties.

TECHNICAL FIELD

This application relates to communications technologies, and in particular, to a quality of service (QoS) flow processing method and device, and a communications system.

BACKGROUND

In a 5th generation mobile communication (5G) system, a non access stratum (NAS) service bearer corresponds to a QoS flow, and an access stratum (AS) service bearer corresponds to a data radio bearer (DRB) of an air interface and a terrestrial tunnel.

A NAS QoS flow has a reflective (reflective) characteristic, and the QoS flow has a characteristic of uplink-downlink symmetry. To be specific, uplink and downlink QoS parameters are the same, and uplink and downlink traffic flow templates (TFT) are also symmetric. For example, an uplink source address and an uplink source port number are respectively a downlink destination address and a downlink destination port number, and an uplink destination address and an uplink destination port number are respectively a downlink source address and a downlink source port number. Data radio bearers (DRB) on an air interface are symmetric in an uplink direction and in a downlink direction. To be specific, a same QoS service is provided in the uplink direction and in the downlink direction. Therefore, a downlink QoS flow having a QoS reflective characteristic and a corresponding uplink QoS flow are mapped to a same DRB.

In the prior art, a network side usually configures a mapping relationship between a QoS flow and a DRB for a UE by using radio resource control (RRC) signaling. For a QoS flow having a reflective characteristic, to reduce control signaling, the network side may not configure an uplink QoS rule of the UE by using RRC signaling, but implicitly notifies the UE by using a downlink data packet, where the QoS rule includes a TFT template and a corresponding QoS parameter. For example, the UE receives a downlink data packet having a reflective characteristic, and performs inversion on a 5-tuple of a packet header of the downlink data packet to obtain an uplink TFT. An index value of a QoS parameter corresponding to the uplink TFT is an index value of a QoS parameter included in the packet header of the downlink packet. On a radio access network (RAN) side, a DRB having a bidirectional characteristic may be used to provide a same QoS service in the uplink direction and in the downlink direction. The UE obtains the uplink QoS rule from the downlink data packet, and maps uplink flows obtained based on the QoS rule to a same DRB.

However, for the UE, there may be a mapping relationship between a QoS flow and a DRB, which is configured by RRC or by through a user plane indication. The two configuration manners have different priorities. During handover, because a target access network device does not know a mapping relationship that is between a QoS flow and a DRB and that is effective in the UE, and subsequently cannot update the mapping relationship between a QoS flow and a DRB, and does not know in which manner to update the mapping relationship, continuity of a user service cannot be ensured.

SUMMARY

This application provides a QoS flow processing method and device, and a communications system, so as to provide a reliable QoS service for a user and ensure continuity of a user service.

According to a first aspect of embodiments of this application, a QoS flow processing method is provided, the method is performed by a second access network device, and the method includes:

receiving, by the second access network device, a message used for a service transfer request, where the message used for the service transfer request is sent by a first access network device and includes configuration information of a QoS flow, and the configuration information includes at least one of the following: first indication information, where the first indication information indicates a QoS rule reflective characteristic of the QoS flow; second indication information, where the second indication information indicates a first manner in which the first access network device obtains the QoS rule reflective characteristic of the QoS flow; third indication information, where the third indication information indicates a second manner in which the first access network device notifies user equipment UE of the QoS rule reflective characteristic of the QoS flow; fourth indication information, where the fourth indication information indicates a first mapping relationship that is from the QoS flow to a data radio bearer DRB of the first access network device and that is used when the UE sends the QoS flow to the first access network device; fifth indication information, where the fifth indication information indicates that a manner in which the first access network device configures the first mapping relationship for the UE is a user plane configuration manner or a control plane configuration manner; sixth indication information, where the sixth indication information indicates priorities that are between the user plane configuration manner and the control plane configuration manner and that are set by the first access network device for the UE; seventh indication information, where the seventh indication information indicates that the UE is to release the mapping relationship that is from the QoS flow to the DRB of the first access network device and that is configured by the first access network device in the user plane configuration manner; or eighth indication information, where the eighth indication information indicates a reflective characteristic of the DRB of the first access network device;

configuring, by the second access network device, a mapping relationship from the QoS flow to a DRB of the second access network device for the UE based on the configuration information; and sending, by the second access network device, a message used to respond to the service transfer request to the first access network device, where the message used to respond to the service transfer request is a message that is used to indicate service transfer and that is sent by the first access network device to the UE, and the message used to indicate the service transfer instructs the UE to map, based on the message used to indicate the service transfer, the QoS flow of at least one service to the DRB of the second access network device for transmission.

In the QoS flow processing method provided above, the second access network device receives the message that is used for the service transfer request and that is sent by the first access network device, and the message used for the service transfer request includes the configuration information of the QoS flow in the first access network device, so that the second access network device can configure the mapping relationship from the QoS flow to the DRB of the second access network device for the UE based on the configuration information, and the second access network device accepts the QoS flow of the UE. Therefore, in a service transfer process, a reliable QoS service can be provided for a user, and continuity of a user service can be ensured.

In a possible design, the configuration information includes the first indication information, and the configuring, by the second access network device, a mapping relationship from the QoS flow to a DRB of the second access network device for the UE based on the configuration information may specifically include: sending, by the second access network device, a downlink data packet including the first indication information on the DRB of the second access network device to which the QoS flow is mapped, so as to configure the mapping relationship from the QoS flow to the DRB of the second access network device for the UE.

In a possible design, the configuration information includes the third indication information, and the second manner is: notifying the UE of the QoS rule reflective characteristic of the QoS flow by including indication information in a downlink data packet, or notifying the UE of the QoS rule reflective characteristic of the QoS flow by using a user plane control data unit; and the configuring, by the second access network device, a mapping relationship from the QoS flow to a DRB of the second access network device for the UE based on the configuration information may specifically include: notifying, by the second access network device, the UE of the QoS rule reflective characteristic of the QoS flow in the second manner indicated in the third indication information, so as to configure the mapping relationship from the QoS flow to the DRB of the second access network device for the UE.

In a possible design, the configuration information further includes the second indication information, the first manner is obtaining the QoS rule reflective characteristic of the QoS flow by using control signaling between the first access network device and a core network, or obtaining the QoS rule reflective characteristic of the QoS flow by using indication information included in a downlink user data packet between the first access network device and the core network, and the second indication information indicates that the first access network device obtains the QoS rule reflective characteristic of the QoS flow by using the indication information included in the downlink user data packet between the first access network device and the core network; and the configuring, by the second access network device, a mapping relationship from the QoS flow to a DRB of the second access network device for the UE based on the configuration information may specifically include: notifying, by the second access network device, the UE of the QoS rule reflective characteristic of the QoS flow in the second manner indicated in the third indication information, so as to configure the mapping relationship from the QoS flow to the DRB of the second access network device for the UE.

In a possible design, the configuration information includes the seventh indication information, and the user plane configuration manner is: configuring the mapping relationship from the QoS flow to the DRB for the UE by using indication information included in a downlink data packet, or configuring the mapping relationship from the QoS flow to the DRB for the UE by using a user plane control data unit; and the configuring, by the second access network device, a mapping relationship from the QoS flow to a DRB of the second access network device for the UE based on the configuration information may specifically include: configuring, by the second access network device, for the QoS flow in the mapping relationship that is from the QoS flow to the DRB of the first access network device and that is configured by the first access network device for the UE in the user plane configuration manner, the mapping relationship from the QoS flow to the DRB of the second access network device.

Optionally, the configuring, by the second access network device, for the QoS flow in the mapping relationship that is from the QoS flow to the DRB of the first access network device and that is configured by the first access network device for the UE in the user plane configuration manner, the mapping relationship from the QoS flow to the DRB of the second access network device may specifically include: configuring, by the second access network device, for the QoS flow in the mapping relationship that is from the QoS flow to the DRB of the first access network device and that is configured by the first access network device for the UE in the user plane configuration manner, the mapping relationship from the QoS flow to the DRB of the second access network device in the user plane configuration manner or the control plane configuration manner, where the control plane configuration manner is: configuring the mapping relationship from the QoS flow to the DRB for the UE by using radio resource control RRC signaling.

In a possible design, the configuration information includes the fourth indication information, and the configuring, by the second access network device, a mapping relationship from the QoS flow to a DRB of the second access network device for the UE based on the configuration information may specifically include: updating, by the second access network device, the first mapping relationship based on the fourth indication information, so as to obtain the mapping relationship from the QoS flow to the DRB of the second access network device.

In a possible design, the configuration information further includes the fifth indication information, and the configuring, by the second access network device, a mapping relationship from the QoS flow to a DRB of the second access network device for the UE based on the configuration information may specifically include: updating, by the second access network device, the first mapping relationship based on the fourth indication information and the fifth indication information, so as to obtain the mapping relationship from the QoS flow to the DRB of the second access network device.

In a possible design, the configuration information includes the sixth indication information, and the configuring, by the second access network device, a mapping relationship from the QoS flow to a DRB of the second access network device for the UE based on the configuration information may specifically include: configuring, by the second access network device, the mapping relationship from the QoS flow to the DRB of the second access network device for the UE based on the sixth indication information.

In a possible design, the configuration information includes the sixth indication information, and the method further includes: updating, by the second access network device, the priorities between the user plane configuration manner and the control plane configuration manner in the UE based on the sixth indication information. Further, the message used to respond to the service transfer request further includes the updated priorities between the user plane configuration manner and the control plane configuration manner.

In a possible design, the configuration information includes the eighth indication information, and the configuring, by the second access network device, a mapping relationship from the QoS flow to a DRB of the second access network device for the UE based on the configuration information includes: setting, by the second access network device, a reflective characteristic of the DRB of the second access network device based on the eighth indication information; and configuring, by the second access network device, the mapping relationship from the QoS flow to the DRB of the second access network device for the UE in the user plane configuration manner, where the user plane configuration manner is configuring the mapping relationship from the QoS flow to the DRB for the UE by using indication information included in a downlink data packet, or configuring the mapping relationship from the QoS flow to the DRB for the UE by using a user plane control data unit. Further, the message used to respond to the service transfer request further includes indication information of the reflective characteristic of the DRB of the second access network device.

In a possible design, after the sending, by the second access network device, a message used to respond to the service transfer request to the first access network device, the method may further include: receiving, by the second access network device, a packet data convergence protocol sequence number PDCP SN status report that is sent by the first access network device for the DRB of the first access network device to which the QoS flow is mapped, where the PDCP SN status report includes the first indication information.

In a possible design, after the sending, by the second access network device, a message used to respond to the service transfer request to the first access network device, the method may further include: receiving, by the second access network device, a downlink data packet that needs to be forwarded and that is sent by the first access network device, where an encapsulation header of the downlink data packet that needs to be forwarded includes the first indication information.

According to a second aspect of the embodiments of this application, a QoS flow processing method is provided, the method is performed by a first access network device, and the method includes:

sending, by the first access network device, a message used for a service transfer request to a second access network device, where the message used for the service transfer request includes configuration information of a QoS flow, and the configuration information includes at least one of the following: first indication information, where the first indication information indicates a QoS rule reflective characteristic of the QoS flow; second indication information, where the second indication information indicates a first manner in which the first access network device obtains the QoS rule reflective characteristic of the QoS flow; third indication information, where the third indication information indicates a second manner in which the first access network device notifies user equipment UE of the QoS rule reflective characteristic of the QoS flow; fourth indication information, where the fourth indication information indicates a first mapping relationship that is from the QoS flow to a data radio bearer DRB of the first access network device and that is used when the UE sends the QoS flow to the first access network device; fifth indication information, where the fifth indication information indicates that a manner in which the first access network device configures the first mapping relationship for the UE is a user plane configuration manner or a control plane configuration manner; sixth indication information, where the sixth indication information indicates priorities that are between the user plane configuration manner and the control plane configuration manner and that are set by the first access network device for the UE; seventh indication information, where the seventh indication information indicates that the UE is to release the mapping relationship that is from the QoS flow to the DRB of the first access network device and that is configured by the first access network device in the user plane configuration manner; or eighth indication information, where the eighth indication information indicates a reflective characteristic of the DRB of the first access network device;

receiving, by the first access network device, a message that is used to respond to the service transfer request and that is sent by the second access network device; and sending, by the first access network device to the UE, a message used to indicate service transfer, where the message used to indicate the service transfer instructs the UE to map, based on the indication message, the QoS flow of at least one service to the DRB of the second access network device for transmission.

In the QoS flow processing method provided above, the first access network device sends the message used for the service transfer request to the second access network device, and the message used for the service transfer request includes the configuration information of the QoS flow in the first access network device, so that the second access network device can configure the mapping relationship from the QoS flow to the DRB of the second access network device for the UE based on the configuration information, and accept the QoS flow of the UE. Therefore, in a service transfer process, a reliable QoS service can be provided for a user, and continuity of a user service can be ensured.

In a possible design, the first manner is: obtaining the QoS rule reflective characteristic of the QoS flow by using control signaling between the first access network device and a core network, or obtaining the QoS rule reflective characteristic of the QoS flow by using indication information included in a downlink user data packet between the first access network device and the core network.

In a possible design, the second manner is: notifying the UE of the QoS rule reflective characteristic of the QoS flow by including indication information in a downlink data packet, or notifying the UE of the QoS rule reflective characteristic of the QoS flow by using a user plane control data unit.

In a possible design, the user plane configuration manner is: configuring the mapping relationship from the QoS flow to the DRB for the UE by using indication information included in a downlink data packet, or configuring the mapping relationship from the QoS flow to the DRB for the UE by using a user plane control data unit; and the control plane configuration manner is: configuring the mapping relationship from the QoS flow to the DRB for the UE by using radio resource control RRC signaling.

In a possible design, after the receiving, by the first access network device, a response message sent by the second access network device, the method further includes: sending, by the first access network device to the second access network device, a packet data convergence protocol sequence number PDCP SN status report of the DRB of the first access network device to which the QoS flow is mapped, where the PDCP SN status report includes the first indication information.

In a possible design, after the receiving, by the first access network device, a response message sent by the second access network device, the method further includes: sending, by the first access network device to the second access network device, a downlink data packet that needs to be forwarded, where an encapsulation header of the downlink data packet that needs to be forwarded includes the first indication information.

According to a third aspect, to implement the QoS flow processing method in the first aspect, an embodiment of this application provides a QoS flow processing device. The QoS flow processing device has a function of implementing the QoS flow processing method. The function may be implemented by hardware, or by hardware executing corresponding software. The hardware or software includes one or more modules corresponding to the function.

In a possible implementation of the third aspect, the QoS flow processing device includes a plurality of function modules or units, configured to implement any QoS flow processing method in the first aspect.

According to a fourth aspect, an embodiment of this application provides an access network device, and a structure of the access network device may include a processor and a transceiver. The processor is configured to support the access network device in performing a corresponding function in any QoS flow processing method in the first aspect. The transceiver is configured to support communication between the access network device and another network device, and may be, for example, a corresponding radio frequency module or baseband module. The access network device may further include a memory. The memory is configured to be coupled to the processor, and stores a program instruction and data that are required by the access network device to perform the QoS flow processing method.

According to a fifth aspect, an embodiment of this application provides a computer storage medium, configured to store a computer software instruction used by the foregoing access network device, and the computer storage medium includes a program designed for performing the first aspect.

According to a sixth aspect, an embodiment of this application provides a computer program product, including an instruction. When the computer program is executed by a computer, the instruction enables the computer to perform functions performed by the second access network device in the foregoing method.

According to a seventh aspect, to implement the QoS flow processing method in the second aspect, an embodiment of this application provides a QoS flow processing device. The QoS flow processing device has a function of implementing the QoS flow processing method. The function may be implemented by hardware, or by hardware executing corresponding software. The hardware or software includes one or more modules corresponding to the function.

In a possible implementation of the seventh aspect, the QoS flow processing device includes a plurality of function modules or units, configured to implement any QoS flow processing method in the second aspect.

According to an eighth aspect, an embodiment of this application provides an access network device, and a structure of the access network device may include a processor and a transceiver. The processor is configured to support the device in performing a corresponding function in any QoS flow processing method in the second aspect. The transceiver is configured to support communication between the access network device and another network device, and may be, for example, a corresponding radio frequency module or baseband module. The access network device may further include a memory. The memory is configured to be coupled to the processor, and stores a program instruction and data that are required by the access network device to perform the QoS flow processing method.

According to a ninth aspect, an embodiment of this application provides a computer storage medium, configured to store a computer software instruction used by the first access network device, and the computer storage medium includes a program designed for performing the second aspect.

According to a tenth aspect, an embodiment of this application provides a computer program product, including an instruction. When the computer program is executed by a computer, the instruction enables the computer to perform functions performed by the first access network device in the foregoing method.

According to an eleventh aspect, an embodiment of this application provides a communications system, including the second access network device of the QoS flow processing device provided in the third aspect, the first access network device of the QoS flow processing device provided in the seventh aspect, and UE.

According to a twelfth aspect, an embodiment of this application provides a communications system, including the access network device provided in the fourth aspect, the access network device provided in the eighth aspect, and UE.

In the QoS flow processing method and device, and the communications system that are provided in the embodiments of this application, the first access network device sends the message used for the service transfer request to the second access network device, and the message used for the service transfer request includes the configuration information of the QoS flow in the first access network device, so that the second access network device can configure the mapping relationship from the QoS flow to the DRB of the second access network device for the UE based on the configuration information, and accept the QoS flow of the UE. Therefore, in a service transfer process, a reliable QoS service can be provided for a user, and continuity of a user service can be ensured.

According to a thirteenth aspect, an embodiment of this application provides a communication processing method, applied to a terminal or a processor of the terminal, and including:

initiating establishment of a protocol data unit session PDU session; and during a process of the PDU session establishment, obtaining configuration information that is of a data radio bearer DRB and that is sent by a radio access network device, where the configuration information of the DRB includes identity information of the DRB, identity information of the PDU session, indication information indicating whether the DRB is a default DRB, and protocol layer configuration information of the DRB.

Based on the thirteenth aspect, in a first possible implementation of the thirteenth aspect, the method further includes:
when no corresponding DRB is configured for an uplink quality-of-service QoS flow, sending data in the uplink QoS flow on the default DRB, where the uplink QoS flow belongs to the PDU session.

Based on the thirteenth aspect or the first possible implementation of the thirteenth aspect, in a second possible implementation of the thirteenth aspect, the configuration information of the DRB is included in a DRB addition or deletion signaling element sent by the radio access network device.

According to a fourteenth aspect, an embodiment of this application provides a communication processing method, applied to a radio access network device or a processor of the radio access network device, and including:
establishing a protocol data unit session PDU session for a terminal; and
during a process of the PDU session establishment, sending configuration information of a data radio bearer DRB to the terminal, where the configuration information of the DRB includes identity information of the DRB, identity information of the PDU session, indication information indicating whether the DRB is a default DRB, and protocol layer configuration information of the DRB.

Based on the fourteenth aspect, in a first possible implementation of the fourteenth aspect, the configuration information of the DRB is included in a DRB addition or deletion signaling element sent by the radio access network device.

According to a fifteenth aspect, an embodiment of this application provides a communication processing device, where the device is a terminal or a processor of the terminal and includes:
a unit configured to initiate establishment of a protocol data unit session PDU session; and
a unit configured to: during a process of the PDU session establishment, obtain dedicated radio resource configuration information sent by a radio access network device, where the dedicated radio resource configuration information includes configuration information of a data radio bearer DRB, and the configuration information of the DRB includes identity information of the DRB, identity information of the PDU session, indication information indicating whether the DRB is a default DRB, and protocol layer configuration information of the DRB.

Based on the fifteenth aspect, in a first possible implementation of the fifteenth aspect, the device further includes:
a unit configured to: when no corresponding DRB is configured for an uplink quality-of-service QoS flow, send data in the uplink QoS flow on the default DRB, where the uplink QoS flow belongs to the PDU session.

Based on the fifteenth aspect or the first possible implementation of the fifteenth aspect, in a second possible implementation of the fifteenth aspect, the configuration information of the DRB is included in a DRB addition or deletion signaling element sent by the radio access network device.

According to a sixteenth aspect, an embodiment of this application provides a communication processing device, where the device is a radio access network device or a processor of the radio access network device and includes:
a unit configured to establish a protocol data unit session PDU session for a terminal; and
a unit configured to: during a process of the PDU session establishment, send configuration information of a data radio bearer DRB to the terminal, where the configuration information of the DRB includes identity information of the DRB, identity information of the PDU session, indication information indicating whether the DRB is a default DRB, and protocol layer configuration information of the DRB.

Based on the sixteenth aspect, in a first possible implementation of the sixteenth aspect, the configuration information of the DRB is included in a DRB addition or deletion signaling element sent by the radio access network device.

According to a seventeenth aspect, an embodiment of this application provides a computer storage medium, including a memory, where the memory stores code, and when the code is invoked, the method in the thirteenth aspect or any possible implementation of the thirteenth aspect or the method in the fourteenth aspect or any possible implementation of the fourteenth aspect is implemented.

DESCRIPTION OF EMBODIMENTS

Figure 1:
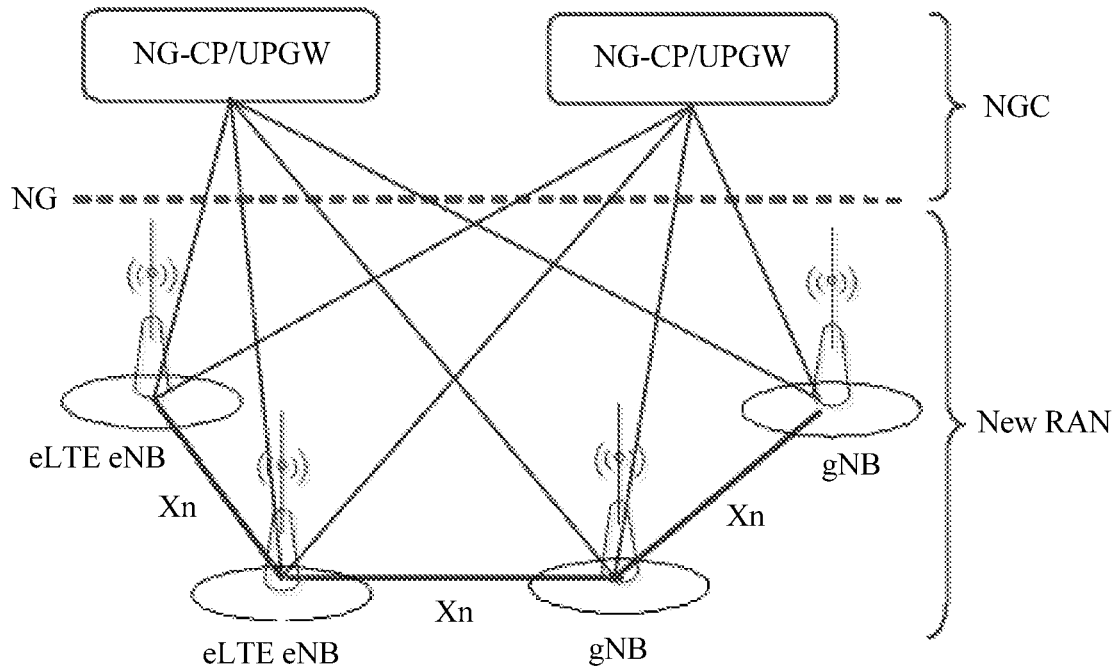
FIG. 1 is a schematic diagram of an application scenario of a QoS flow processing method according to an embodiment of this application.

The technical solutions provided in the embodiments of this application are applicable to a mobile network. FIG. 1 is a schematic diagram of an application scenario of a QoS flow processing method according to an embodiment of this application. As shown in FIG. 1, the QoS flow processing method provided in this embodiment of this application may be applied to a new radio access network (new RAN). The new RAN includes a next generation access network device gNB (5G base station) and an enhanced LTE (eLTE) access network device (eNB).

Figure 2:
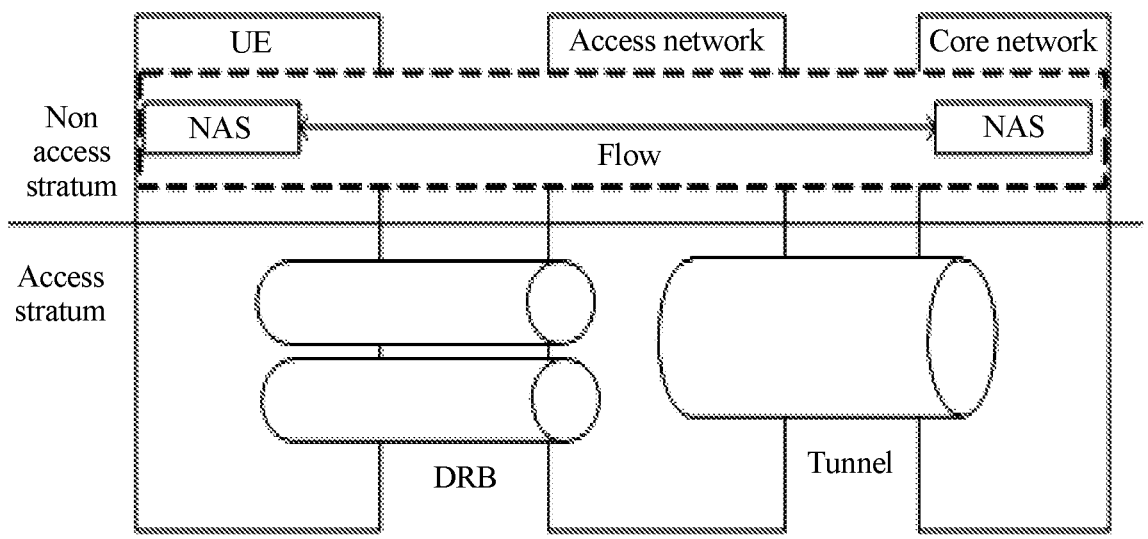
FIG. 2 is a schematic diagram of QoS flow processing in a mobile network according to an embodiment of this application.

FIG. 2 is a schematic diagram of QoS flow processing in a mobile network according to an embodiment of this application. As shown in FIG. 2, a NAS service bearer corresponds to a QoS flow, and an AS service bearer corresponds to a DRB of an air interface and a terrestrial tunnel. The tunnel is established based on a protocol data unit (PDU) session (session). In other words, QoS flows belonging to a same PDU session use a same tunnel. The PDU session is a link between a user equipment (UE) and a data network (DN) to provide a protocol data unit connection service. Each PDU session has a unique identity, and the unique identity of the PDU session may be one of the following: a PDU session identifier, an access point name (APN), an identity of a user plane core network device, an address (for example, an IP address) of the user plane core network device, and an IP address allocated by the user plane core network device to the UE. A QoS flow refers to data flows having a same QoS requirement in one PDU session, and may be a plurality of IP flows having a same QoS requirement.

Network elements involved in the technical solutions provided in the embodiments of this application mainly include:

(1) An access network device

A base station, which includes a control plane and a user plane, provides functions such as service establishment, mobility, and user data scheduling, and includes an eLTE eNB and a gNB.

(2) A core network network element

A core network control plane, namely, a next generation control plane (NG-CP), includes a network element repository function (so as to implement discovery and communication between NG-CPs), an access and mobility management function (for processing UE-level access and mobility management), a session management function (supporting IP address allocation of the UE, selection and control of a user plane entity, and further including a QoS-related rule, session-related charging and validity check), a policy control function (providing a dynamic policy, for example, QoS, charging, access control, and routing, for another function), and a network capability exposure function (providing some open capability information to a third party).

A core network user plane, namely, a next generation user plane (NG-UP) or a user plane gateway (UPGW), includes external nodes interconnected to a PDU session, packet routing and forwarding, transmission processing (QoS enforcement), intra-system/inter-system switching anchor, and an optional function such as packet inspection and validity check.

(3) A user equipment UE, which performs functions such as data sending and receiving, and measurement.

(4) An application server, which provides an application-level service requirement.

(5) A packet data network (PDN), which is also referred to as a DN and is a data network external to a 3GPP network, for example, a network such as an Internet network providing a data service for the UE.

The following describes the technical solutions of this application in detail with reference to specific embodiments. The following specific embodiments may be mutually combined, and same or similar concepts or processes may not be repeatedly described in some embodiments.

Figure 3:
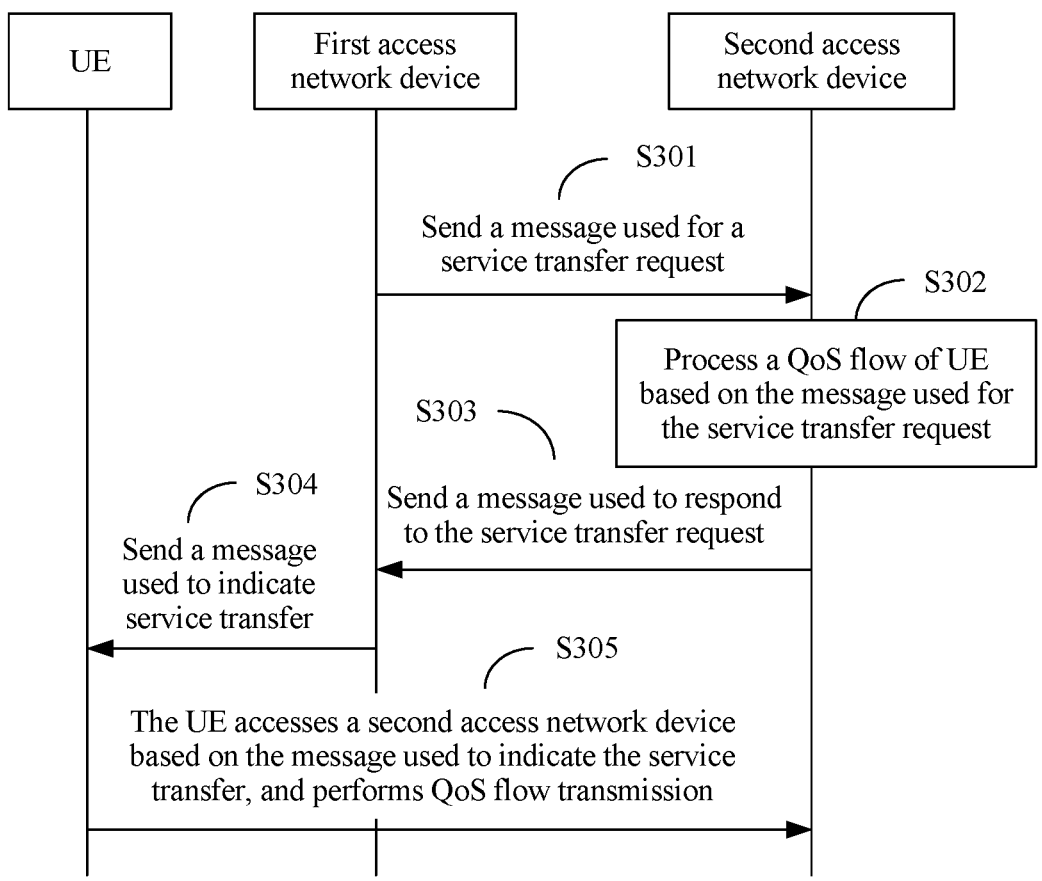
FIG. 3 is a schematic flowchart of a QoS flow processing method according to an embodiment of this application.

FIG. 3 is a schematic flowchart of a QoS flow processing method according to an embodiment of this application. As shown in FIG. 3, the QoS flow processing method provided in this embodiment includes the following steps:

S301. A first access network device sends a message used for a service transfer request to a second access network device.

S302. The second access network device processes a QoS flow of a UE based on the message used for the service transfer request.

S303. The second access network device sends a message used to respond to the service transfer request to the first access network device.

S304. The first access network device sends a message used to indicate service transfer to the UE.

S305. The UE accesses the second access network device based on the message used to indicate the service transfer, and performs QoS flow transmission.

It may be understood that before S301, the first access network device provides a service for the UE, and when the first access network device determines, based on information such as a measurement signal reported by the UE, that the UE needs to be handed over to the second access network device, the first access network device sends the message used for the service transfer request to the second access network device. To ensure continuity of a service of the UE, the message used for the service transfer request needs to include a QoS parameter and necessary QoS configuration information of the QoS flow of the UE, so that the second access network device processes the QoS flow of the UE based on the configuration information of the QoS flow.

In other words, the message that is used for the service transfer request and that is sent by the first access network device to the second access network device includes the configuration information of the QoS flow, and the second access network device configures a mapping relationship from the QoS flow to a DRB of the second access network device for the UE based on the configuration information, so as to accept the QoS flow of the UE.

Possibly, some QoS flows in the first access network device have a QoS rule reflective characteristic. The first access network device may receive a QoS rule reflective characteristic of the QoS flow by using control plane signaling between the first access network device and a core network. The first access network device may alternatively obtain the QoS rule reflective characteristic of the QoS flow by using a user data packet between the first access network device and the core network. For example, indication information is included in an encapsulation header of a downlink user data packet between the core network and the first access network device, to indicate that the data packet of the QoS flow has the QoS rule reflective characteristic. An identity (ID) of the QoS flow may also be included in the encapsulation header of the user data packet between the access network device and the core network, and the QoS flow ID may indicate the QoS parameter of the QoS flow, and may further identify the QoS flow. The core network may also notify, by using a non-access stratum message, the UE that the QoS flow of the UE has the QoS rule reflective characteristic. The QoS parameter includes one or more of the following: a packet delay budget, a packet loss rate, a priority, a rate, and the like required by a service flow.

On an air interface side, the first access network device may notify, in a user plane manner, the UE that the QoS flow has the QoS rule reflective characteristic. In an optional manner, the first access network device may include indication information in a packet header of a downlink data packet, to indicate that the data packet of the QoS flow has the QoS rule reflective characteristic. The indication information may be located in a protocol header of any one of a PDCP layer, an RLC layer, a MAC layer, a PDAP layer, and the like. The PDAP layer is a protocol layer above the PDCP layer. The PDAP protocol stack entity is configured based on a PDU session. To be specific, one PDAP protocol entity is established for one PDU session.

In another optional manner, the first access network device may notify, by using a user plane control data unit, the UE that a data packet of the QoS flow has the QoS rule reflective characteristic. The user plane control data unit includes a control PDU of any one of a PDAP protocol layer, a PDCP protocol layer, an RLC protocol layer, a MAC protocol layer, and the like. For example, a packet data convergence protocol (PDCP) control PDU is used to indicate a QoS flow ID and a PDCP sequence number (SN) of the data packet having the QoS rule reflective characteristic.

Further, the first access network device further configures a mapping relationship from the QoS flow to a DRB of the first access network device for the UE.

In a first-category optional configuration manner, the first access network device may configure the mapping relationship from the QoS flow to the DRB of the first access network device for the UE in a control plane manner, for example, configure the mapping relationship from the QoS flow to the DRB of the first access network device for the UE by using radio resource control (RRC) signaling. During sending of uplink data, the UE sends, based on a QoS flow obtained by using a NAS TFT and the mapping relationship that is from the QoS flow to the DRB of the first access network device and that is configured by an AS, an uplink data packet on a corresponding DRB.

In a second-category optional configuration manner, the first access network device may alternatively configure the mapping relationship from the QoS flow to the DRB of the first access network device for the UE in a user plane manner. In an optional manner, for the QoS flow having the QoS rule reflective characteristic, the mapping relationship from the QoS flow to the DRB of the first access network device is configured for the UE by including indication information in a downlink data packet. For example, the first access network device sends a downlink data packet of a QoS flow 1 on a DRB 1 of the first access network device, and indicates to the UE that the QoS flow 1 has the reflective characteristic. The UE receives the data packet of the QoS flow 1 on the DRB 1; performs inversion on a 5-tuple of a packet header of the downlink data packet to obtain an uplink TFT, where an index value of QoS corresponding to the TFT is the QoS flow 1; and maps a data packet of the uplink QoS flow 1 to the DRB 1. The UE may obtain a mapping relationship from the QoS flow 1 to the DRB 1, namely, a mapping relationship from an uplink QoS flow to a DRB in this manner, and store the mapping relationship.

Further, configuring the mapping relationship from the QoS flow to the DRB in the user plane manner further includes: notifying, by the first access network device, the UE of a reflective characteristic of the DRB of the first access network device by using RRC signaling, where the reflective characteristic of the DRB means that it is allowed to configure the mapping relationship from the QoS flow to the DRB in the user plane manner. The first access network device configures a reflective characteristic of each DRB, and the first access network device may also configure the reflective characteristic of the DRB of the first access network device based on a level of a session, and if a session is configured with a DRB reflective characteristic, all DRBs corresponding to the session have the reflective characteristic. The UE receives a downlink data packet of a QoS flow 2 on a DRB 2. If the data packet has the QoS rule reflective characteristic and the DRB 2 has the reflective characteristic, the UE maps a data packet of an uplink QoS flow 2 to the DRB 2. If the DRB 2 does not have the reflective characteristic, the mapping relationship from the QoS flow to the DRB for the UE cannot be configured in the user plane manner. Further, the first access network device may configure or modify, by using RRC signaling, the reflective characteristic of a DRB or the reflective characteristic for of DRBs corresponding to a session.

Another optional manner of configuring the mapping relationship from the QoS flow to the DRB in the user plane manner is: indicating, by the first access network device, a QoS flow ID in a packet header of a downlink data packet, and instructing, in a user plane indication manner, the UE to map an uplink QoS flow indicated by the QoS flow ID to a DRB on which the corresponding downlink data packet is received. The user plane indication manner means that indication information is included in a user plane data packet, and the indication information may be an independent indication. It should be noted that the manner of configuring the mapping relationship from the QoS flow to the DRB in the user plane manner is also applicable to a QoS flow that does not have the QoS rule reflective characteristic. For example, the UE receives a downlink data packet of a QoS flow 2 on a DRB 2, and if the data packet does not have the QoS rule reflective characteristic but the DRB 2 has the reflective characteristic, the UE maps a data packet of an uplink QoS flow 2 to the DRB 2. A TFT template for a data packet of the QoS flow 2 is not obtained by using a reflective characteristic of a downlink data packet.

Another manner of configuring the mapping relationship from the QoS flow to the DRB in the user plane manner is: configuring the mapping relationship from the QoS flow to the DRB for the UE by using a user plane control data unit. The user plane control data unit includes a control PDU of any one of a PDAP protocol layer, a PDCP protocol layer, an RLC protocol layer, a MAC protocol layer, and the like. For example, a PDCP control PDU is used to indicate a QoS flow ID group. The UE receives the PDCP control PDU, and maps uplink QoS flows indicated by the QoS flow ID group to the DRB. It should be noted that the user plane manner in which configuring the mapping relationship from the QoS flow to the DRB is also applicable to a QoS flow that does not have the QoS rule reflective characteristic.

It should be noted that the mapping relationship from an uplink QoS flow to a DRB can be configured in the above two categories of configuration manners, and priorities may be set between the two categories of configuration manners. It may be understood that priority settings between the two categories of configuration manners may include the following several cases: A priority of the first-category configuration manner is higher than a priority of the second-category configuration manner, that is, the mapping relationship that is from the QoS flow to the DRB and that is configured in the control plane manner takes precedence; or a priority of the second-category configuration manner is higher than a priority of the first-category configuration manner, that is, the mapping relationship that is from the QoS flow to the DRB and that is configured in the user plane manner takes precedence; or a configuration manner corresponding to a latest mapping relationship received by the UE has a highest priority, that is, the latest mapping relationship received by the UE takes precedence. In the UE, for a same category of configuration manner, an old mapping relationship stored in the UE is updated with a newly configured mapping relationship. For example, an original mapping relationship configured by using RRC may be updated by using a new mapping relationship configured by using RRC.

Possibly, the priorities between the two categories of configuration manners may be specified in the protocol standard, or negotiated among access network devices. Then, priority settings between the two categories of configuration manners are the same for all access network devices. The priorities between the above two categories of configuration manners may be set by an access network device itself. In other words, the access network device may set, for the UE, the priority settings between the two categories of configuration manners of configuring the mapping relationship from the QoS flow to the DRB.

It should be noted that for the UE, it is also possible that no DRB corresponding to an uplink QoS flow is configured in the first access network device. Then, the UE sends a data packet of the QoS flow on a default bearer (default DRB) of the first access network device.

To ensure continuity of a service of the UE, the message that is used for the service transfer request and that is sent by the first access network device to the second access network device needs to include the configuration information of the QoS flow of the UE. The configuration information may include at least one of the following:

first indication information, where the first indication information indicates a QoS rule reflective characteristic of the QoS flow; second indication information, where the second indication information indicates a first manner in which the first access network device obtains the QoS rule reflective characteristic of the QoS flow; third indication information, where the third indication information indicates a second manner in which the first access network device notifies the user equipment UE of the QoS rule reflective characteristic of the QoS flow; fourth indication information, where the fourth indication information indicates a first mapping relationship that is from the QoS flow to a data radio bearer DRB of the first access network device and that is used when the UE sends the QoS flow to the first access network device; fifth indication information, where the fifth indication information indicates that a manner in which the first access network device configures the first mapping relationship for the UE is a user plane configuration manner or a control plane configuration manner; sixth indication information, where the sixth indication information indicates priorities that are between the user plane configuration manner and the control plane configuration manner and that are set by the first access network device for the UE; seventh indication information, where the seventh indication information indicates that the UE is to release the mapping relationship that is from the QoS flow to the DRB of the first access network device and that is configured by the first access network device in the user plane configuration manner; or eighth indication information, where the eighth indication information indicates the reflective characteristic of the DRB of the first access network device.

It should be noted that for the UE, it is also possible that no DRB corresponding to an uplink QoS flow is configured in the first access network device. Then, the UE sends a data packet of the QoS flow on the default bearer (default DRB) of the first access network device. Further, the configuration information may include an identity (for example, a default DRB ID) of the default bearer (default DRB) in the first access network device, session information corresponding to the default DRB, and session information of a dedicated DRB. The session information includes an identity of a session.

For example, the configuration information includes "an indication (namely, the first indication information) of the QoS rule reflective characteristic of the QoS flow", and the second access network device may send a downlink data packet on the DRB of the second access network device to which the QoS flow is mapped, and include the indication of the QoS rule reflective characteristic of the QoS flow in a packet header of the data packet. For example, it may be indicated implicitly that the data packet has the QoS rule reflective characteristic of the QoS flow by including a QoS flow ID, or it may be indicated by using dedicated indication information that the data packet has the QoS rule reflective characteristic of the QoS flow. After receiving the downlink data packet including the indication of the QoS rule reflective characteristic of the QoS flow, the UE may map an uplink QoS flow indicated by the indication information to a DRB on which the corresponding downlink data packet is received. That is, the second access network device may configure the mapping relationship from the QoS flow to the DRB of the second access network device for the UE in the user plane manner.

For example, the configuration information includes "an indication (namely, the third indication information) indicating the manner in which the first access network device notifies the UE of the QoS rule reflective characteristic of the QoS flow", and the second access network device may determine, with reference to a notification manner of the first access network device, a manner in which the second access network device notifies the UE of the QoS rule reflective characteristic of the QoS flow. That is, the second access network device may notify the UE of the QoS rule reflective characteristic of the QoS flow in the manner indicated in the third indication information. After receiving a notification message of the QoS rule reflective characteristic of the QoS flow, the UE maps an uplink QoS flow to a DRB on which a corresponding downlink data packet is received. That is, the second access network device may configure the mapping relationship from the QoS flow to the DRB of the second access network device for the UE in the user plane manner.

Further, the configuration information further includes "an indication (namely, the second indication information) indicating the manner in which the first access network device obtains the QoS rule reflective characteristic of the QoS flow"; and for a QoS flow having the QoS rule reflective characteristic obtained by using control signaling, the second access network device may not include independent indication information in a downlink data packet to indicate that the data packet has the QoS rule reflective characteristic of the QoS flow. In other words, the configuration information further includes the second indication information, and the second indication information indicates that the first access network device obtains the QoS rule reflective characteristic of the QoS flow by using the indication information included in a downlink user data packet between the first access network device and the core network. Then, the second access network device may notify the UE of the QoS rule reflective characteristic of the QoS flow in the manner indicated in the third indication information. After receiving a notification message of the QoS rule reflective characteristic of the QoS flow, the UE maps an uplink QoS flow to a DRB on which the corresponding downlink data packet is received. That is, the second access network device may configure the mapping relationship from the QoS flow to the DRB of the second access network device for the UE in the user plane manner.

For example, the configuration information includes "an invalidation indication (namely, the seventh indication information) of the mapping relationship that is from the QoS flow to the DRB of the first access network device and that is configured by the first access network device for the UE in the user plane configuration manner". The invalidation indication means that during service transfer of the UE, if the DRB of the first access network device is released, the UE releases the mapping relationship that is from the QoS flow to the DRB and that is configured in the user plane configuration manner. Then, the second access network device needs to re-configure, for the QoS flow in the mapping relationship that is from the QoS flow to the DRB of the first access network device and that is released on a first access network device side, the mapping relationship from the QoS flow to the DRB of the second access network device on a second access network device side. Specifically, the second access network device may configure the mapping relationship (referred to as a second mapping relationship below) from the QoS flow to the DRB of the second access network device for the UE in the user plane configuration manner or in the control plane configuration manner.

Further, the second access network device may configure the second mapping relationship for the UE in the control plane configuration manner (that is, configure the mapping relationship from the QoS flow to the DRB of the second access network device for the UE), and then the second access network device includes the second mapping relationship in the message used to respond to the service transfer request. After receiving the message used to respond to the service transfer request, the first access network device notifies the UE of the second mapping relationship configured by the second access network device. After successfully accessing the second access network device, the UE sends, based on the second mapping relationship configured by the second access network device, an uplink data packet of the QoS flow on the DRB that is of the second access network device and that corresponds to the QoS flow.

The second access network device may alternatively configure the second mapping relationship for the UE in the user plane configuration manner.

In one possibility, the second access network device configures the second mapping relationship for the UE by including indication information in a downlink data packet. For example, the second access network device enables a data packet of an uplink QoS flow 1 being sent on a DRB 1 of the second access network device, then the second access network device sends a data packet of the downlink QoS flow 1 having the QoS rule reflective characteristic on the DRB 1 of the second access network device. After receiving this data packet on the DRB 1, the UE obtains an uplink QoS rule by using the QoS rule reflective characteristic, and learns that the data packet of the uplink QoS flow 1 is sent on the DRB 1, where the uplink QoS rule includes an uplink TFT and a corresponding QoS parameter, and the QoS parameter is indexed by using the QoS flow 1. For another example, the second access network device includes a QoS flow ID in a packet header of the downlink data packet, to instruct the UE to map an uplink QoS flow identified by the QoS flow ID to a DRB on which the corresponding downlink data packet is received. It should be noted that this manner is also applicable to a QoS flow that does not have the QoS rule reflective characteristic.

In another possibility, the second access network device notifies the UE by using a user plane control data unit. For example, a PDCP control PDU is used to indicate a QoS flow ID group. The UE receives the PDCP control PDU, and maps an uplink QoS flow indicated by the QoS flow ID group to the DRB.

For example, the configuration information includes "the first mapping relationship (namely, the fourth indication information) that is from the QoS flow to the data radio bearer DRB of the first access network device and that is used when the UE sends the QoS flow to the first access network device", and then the second access network device may determine, based on a preset algorithm, whether to update the first mapping relationship.

When the first mapping relationship is updated, in one possibility, the priorities between the two categories of configuration manners of configuring the mapping relationship from the QoS flow to the DRB may be specified in the protocol standard, or negotiated among access network devices. Then, priority settings between the two categories of configuration manners are the same for all access network devices. Further, if the priority settings between the two categories of configuration manners are the same for the first access network device and the second access network device, the second access network device may update the mapping relationship from the QoS flow to the DRB of the second access network device in an appropriate configuration manner, for example, select a same-level or higher-level configuration manner to obtain the second mapping relationship from the QoS flow to the DRB of the second access network device.

Further, the configuration information further includes "the configuration manner (namely, the fifth indication information) in which the first access network device configures the first mapping relationship for the UE", and the second access network device may select an appropriate configuration manner based on the fourth indication information and the fifth indication information with reference to the priorities between the two configuration manners, to update the mapping relationship from the QoS flow to the DRB, so as to obtain the second mapping relationship from the QoS flow to the DRB of the second access network device.

The second access network device may alternatively configure the mapping relationship from the QoS flow to the DRB of the second access network device in a default high-priority configuration manner. In one possibility, it is specified, through specification in the protocol standard or through negotiation among access network devices, that a priority of a mapping relationship that is from a QoS flow to a DRB of a target access network device and that is configured by the target access network device in a service transfer process is the highest. Further, the second access network device includes the second mapping relationship configured for the UE in the message used to respond to the service transfer request. After receiving the message used to respond to the service transfer request, the first access network device notifies the UE of the second mapping relationship configured by the second access network device. The UE sets the configuration manner of the second mapping relationship to a highest priority and updates the mapping relationship from the QoS flow to the DRB. After successfully accessing the second access network device, the UE sends, based on the second mapping relationship, an uplink data packet of the QoS flow on the DRB of the second access network device corresponding to the QoS flow.

For example, the configuration information includes "the priorities (namely, the sixth indication information) between the user plane configuration manner and the control plane configuration manner in the first access network device". As described above, the priorities between the two categories of configuration manners of configuring the mapping relationship from the QoS flow to the DRB may be set by the access network device itself, and then the priority settings between the two categories of configuration manners may be different for all access network devices. In other words, the access network device may set the priorities between the two categories of configuration manners for the UE. Then, if priority settings between the user plane configuration manner and the control plane configuration manner are different for the first access network device and the second access network device, the second access network device may determine, according to algorithm implementation, whether to update the priorities between the two categories of configuration manners for the UE.

Optionally, the second access network device may alternatively update the priority settings between the two categories of configuration manners and update the mapping relationship from the QoS flow to the DRB for the UE. Further, the second access network device includes, to the message used to respond to the service transfer request, the second mapping relationship configured for the UE and the priorities set by the second access network device between the two categories of configuration manners. After receiving the message used to respond to the service transfer request, the first access network device notifies the UE of the priorities that are between the user plane configuration manner and the control plane configuration manner and that are set by the second access network device and the configured second mapping relationship. After receiving the information, the UE updates the priority settings between the user plane configuration manner and the control plane configuration manner, and after successfully accessing the second access network device, the UE sends, based on the second mapping relationship, an uplink data packet of the QoS flow on the DRB of the second access network device corresponding to the QoS flow.

For example, the configuration information includes "an indication (namely, the eighth indication information) of the reflective characteristic of the DRB of the first access network device", and the second access network device may set the reflective characteristic of the DRB of the second access network device with reference to the eighth indication information. In this case, the second access network device may configure the mapping relationship from the QoS flow to the DRB of the second access network device for the UE in the user plane manner. The second access network device further includes indication information of the reflective characteristic of the DRB of the second access network device in the message used to respond to the service transfer request. After receiving the message used to respond to the service transfer request, the first access network device notifies the UE of the indication information set by the second access network device for the reflective characteristic of the DRB of the second access network device and the second mapping relationship configured by the second access network device for the UE in the user plane manner. After receiving the information, the UE sends, with reference to the reflective characteristic of the DRB of the second access network device and the mapping relationship that is from the QoS flow to the DRB of the second access network device and that is configured in the user plane manner, an uplink data packet of the QoS flow on the DRB of the second access network device corresponding to the QoS flow. It should be noted that generally, the mapping relationship that is from the QoS flow to the DRB of the second access network device and that is configured by the second access network device for the UE in the user plane manner can take effect only when the DRB of the second access network device has the reflective characteristic.

It should be noted that after the UE successfully accesses the second access network device, if there is an uplink QoS flow for which no corresponding DRB is configured, the UE sends a data packet of the QoS flow on a default bearer (default DRB) of the second access network device. Alternatively, the UE may initiate an RRC request to the second access network device, to request the second access network device to configure a DRB for the QoS flow. Possibly, the second access network device further includes a default DRB ID of the second access network device in the message used to respond to the service transfer request, and may further in session information of the default DRB, where the session information includes an identity of the session.

In the QoS flow processing method provided in this embodiment, the first access network device sends the message used for the service transfer request to the second access network device, and the message used for the service transfer request includes the configuration information of the QoS flow in the first access network device, so that the second access network device can configure the mapping relationship from the QoS flow to the DRB of the second access network device for the UE based on the configuration information, and accept the QoS flow of the UE. Therefore, in a service transfer process, a reliable QoS service can be provided for a user, and continuity of a user service can be ensured.

Figure 4:
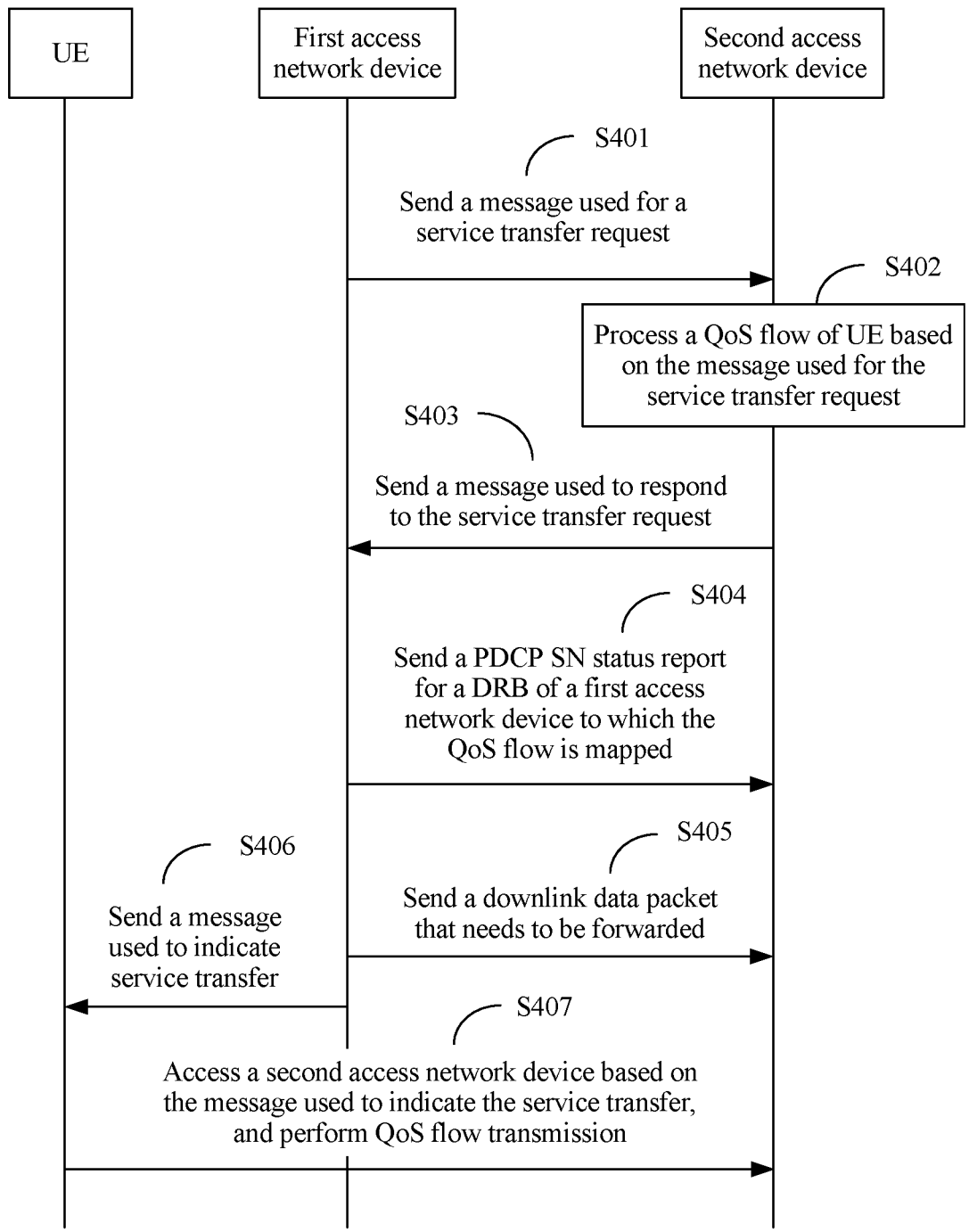
FIG. 4 is another schematic flowchart of a QoS flow processing method according to an embodiment of this application.

FIG. 4 is a schematic flowchart of a QoS flow processing method according to an embodiment of this application. As shown in FIG. 4, the QoS flow processing method provided in this embodiment includes the following steps:

S401. A first access network device sends a message used for a service transfer request to a second access network device.

S402. The second access network device processes a QoS flow of UE based on the message used for the service transfer request.

S403. The second access network device sends a message used to respond to the service transfer request to the first access network device.

S404. The first access network device sends, to the radio second access network device, a PDCP SN status report for a DRB of the first access network device to which the QoS flow is mapped.

S405. The first access network device sends, to the second access network device, a downlink data packet that needs to be forwarded.

S406. The first access network device sends, to the UE, a message used to indicate service transfer.

S407. The UE accesses the second access network device based on the message used to indicate the service transfer, and performs QoS flow transmission.

It should be noted that the PDCP SN status report for the DRB of the first access network device to which the QoS flow is mapped indicates a status of sending, by the first access network device, a data packet following a successfully sent data packet, for example, a sending success or a sending failure. The sending success means that an acknowledgment from the UE about successful receiving has been obtained. Meanwhile, all data packets preceding the successfully sent data packet are considered as being successfully sent or timing out and no need to be sent.

Based on the embodiment shown in FIG. 3, in an optional implementation, the first access network device may alternatively notify the second access network device of a QoS rule reflective characteristic of a QoS flow by using a data forwarding (data forwarding) process.

For example, in the data forwarding process, the first access network device forwards, to the second access network device, a downlink data packet that needs to be forwarded. Specifically, the first access network device forwards the downlink data packet to the second access network device by establishing a forwarding tunnel. An indication of the QoS rule reflective characteristic of the QoS flow is included in an encapsulation header of a data packet, for example, in a GTP-U header of a data forwarding tunnel.

Optionally, the indication may be independent indication information, or may be an implicit indication implemented by using other information. For example, a QoS flow ID is included in an encapsulation header of a data packet. Then, the QoS flow ID may be used to implicitly indicate the QoS rule reflective characteristic of the QoS flow.

Further, the downlink data packet that needs to be forwarded includes a data packet to which a PDCP SN is allocated but whose receiving is not acknowledged by the UE, and a new data packet from a core network to which no PDCP SN is allocated. Different indication solutions may be used for different parts of a downlink forwarding data packet.

In one implementation solution, for a data packet to which a PDCP SN is allocated, a QoS flow ID is included in an encapsulation header of the data packet to implicitly indicate that the data packet has the QoS rule reflective characteristic. For a data packet to which no PDCP SN is allocated, independent indication information is included in an encapsulation header of the data packet to indicate that the data packet has the QoS rule reflective characteristic.

In another implementation solution, for a data packet to which a PDCP SN is allocated, indication information may be included in the PDCP SN status report to indicate that a data packet to be forwarded has the QoS rule reflective characteristic.

In the QoS flow processing method provided in this embodiment, a target access network device is notified of a QoS rule reflective characteristic of a QoS flow by using a data forwarding (data forwarding) process or by including indication information in a PDCP SN status report message of a DRB of a source access network device to which the QoS flow is mapped, so that the target access network device can configure a mapping relationship from the QoS flow to a DRB of the target access network device for the UE based on the QoS rule reflective characteristic of the QoS flow, and accept the QoS flow of the UE. Therefore, in a service transfer process, a reliable QoS service can be provided for a user and continuity of a user service can be ensured.

It should be noted that the QoS flow processing method provided in this embodiment of this application may further be applied to a multi-connectivity scenario. The QoS flow of the UE is migrated from a master access network device to a secondary access network device, or from a secondary access network device to a master access network device. Implementation principles and processes thereof are similar, and details are not described herein again.

In this embodiment, the message used for the service transfer request is used to request to transfer the service from the first access network device to the second access network device. The message used for the service transfer request corresponds to a handover request message in a handover scenario and messages in the multi-connectivity scenario, such as a secondary access network device addition request message, a secondary access network device modification request message, and a secondary access network device release request message.

In this embodiment, the message used to respond to the service transfer request is used to respond to the message that is used for the service transfer request and that is used to request to transfer the service from the first access network device to the second access network device. The message used to respond to the service transfer request corresponds to a handover request acknowledgement message in the handover scenario and messages in the multi-connectivity scenario, such as a secondary access network device addition request acknowledgement message, a secondary access network device modification request acknowledgement message, and a secondary access network device release request acknowledgement message.

Figure 5:
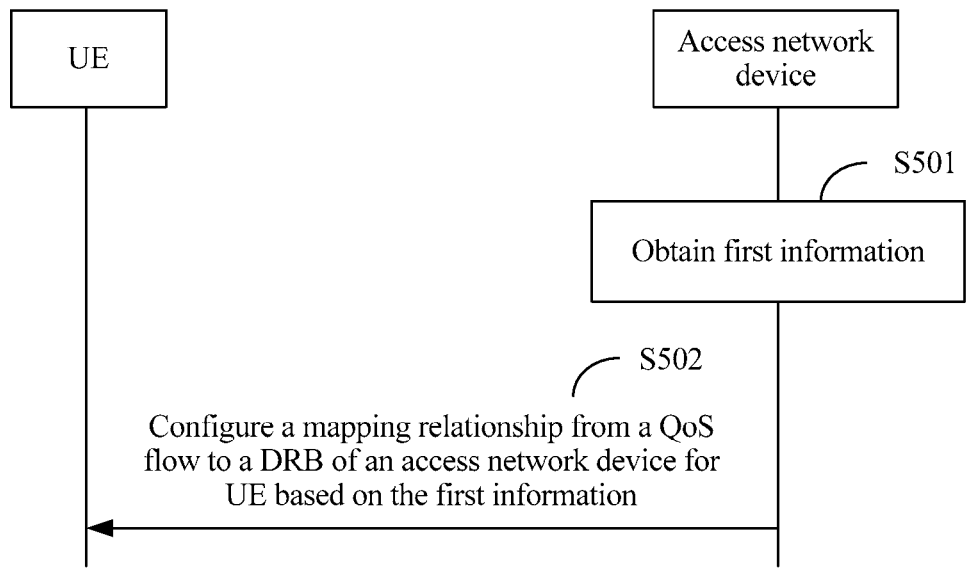
FIG. 5 is another schematic flowchart of a QoS flow processing method according to an embodiment of this application.

FIG. 5 is a schematic flowchart of a QoS flow processing method according to an embodiment of this application. As shown in FIG. 5, the QoS flow processing method provided in this embodiment includes the following steps:

S501. An access network device obtains first information.

S502. The access network device configures a mapping relationship from a QoS flow to a DRB of the access network device for UE based on the first information, so as to process the QoS flow of the UE.

Specifically, the access network device may obtain the first information by using control plane signaling between the access network device and a core network, or the access network device may obtain the first information by using a user data packet between the access network device and the core network. For example, in an optional manner, the first indication is included in an encapsulation header of a downlink user data packet between the core network and the access network device.

In one possibility, the first information is used to indicate a QoS rule reflective characteristic of the QoS flow of the UE. The access network device receives the QoS rule reflective characteristic of the QoS flow by using the control plane signaling between the access network device and the core network, or the access network device may obtain the QoS rule reflective characteristic of the QoS flow by using the user data packet between the access network device and the core network. For example, indication information is included in an encapsulation header of a downlink user data packet between the core network and the access network device, to indicate that the data packet of the QoS flow has the QoS rule reflective characteristic. A QoS flow ID is also included in an encapsulation header of the user data packet between the access network device and the core network, and the QoS flow ID indicates a QoS parameter of the QoS flow, and may also identify the QoS flow.

In another possibility, the access network device already has a QoS flow having the QoS rule reflective characteristic, and the first information is used to instruct to delete the QoS rule reflective characteristic of the QoS flow of the UE. To be specific, the core network may notify the access network device to deactivate a QoS rule reflective characteristic of a QoS flow.

In an optional manner, the access network device receives, by using the control plane signaling between the access network device and the core network, a command for deactivating the QoS rule reflective characteristic of the QoS flow.

In another optional manner, indication information is included in an encapsulation header of a downlink user data packet between the core network and the access network device, to instruct to deactivate the QoS rule reflective characteristic of the data packet of the QoS flow.

Further, the access network device may include in a downlink data packet an indication for deactivating the QoS rule reflective characteristic, to instruct the UE to deactivate the QoS rule reflective characteristic of the QoS flow. The UE deletes a QoS rule that is of the QoS flow and that is obtained by using the reflective characteristic. Optionally, the access network device may further instruct, in a user plane manner, the UE to deactivate a QoS rule reflective characteristic of a QoS flow. Specifically, the access network device may instruct, by using a user plane control data unit, the UE to deactivate the QoS rule reflective characteristic of the QoS flow. For example, a PDCP control PDU is used to indicate a QoS flow ID group. The UE receives the PDCP control PDU; and for a QoS flow of the QoS flow ID group, the UE deletes a QoS rule that is of the QoS flow and that is obtained by using the reflective characteristic.

Further, the core network may notify the UE that the QoS rule reflective characteristic has been deactivated. The core network may notify, by using a NAS message, the UE that the QoS rule reflective characteristic of the QoS flow has been deactivated. The UE receives the deactivation command, and terminates the QoS rule that is generated based on the reflective characteristic. The core network may also implicitly notify, by configuring a new QoS rule of the QoS flow, that the QoS rule reflective characteristic of the QoS flow has been deactivated.

Further, the QoS rule reflective characteristic of the QoS flow has been deactivated, and the access network device needs to configure the mapping relationship from the QoS flow to the DRB of the access network device for the UE. In an optional manner, the access network device may configure the mapping relationship from the QoS flow to the DRB of the access network device for the UE by using RRC signaling. When sending uplink data, the UE sends, based on a QoS flow obtained by a NAS and the mapping relationship that is from the QoS flow to the DRB of the access network device and that is configured by an AS, an uplink data packet on a corresponding DRB.

If the QoS flow has the QoS rule reflective characteristic, the access network device may further configure the mapping relationship from the QoS flow to the DRB of the access network device for the UE by using the QoS rule reflective characteristic of the QoS flow in a user plane configuration manner. For example, the access network device sends a downlink data packet of a QoS flow 1 on a DRB 1, and indicates to the UE that the QoS flow 1 has the reflective characteristic. The UE receives the data packet of the QoS flow 1 on the DRB 1; performs inversion on a 5-tuple of a packet header of the downlink data packet to obtain an uplink TFT, where an index value of QoS corresponding to the TFT is the QoS flow 1; and maps a data packet of the uplink QoS flow 1 to the DRB 1. The UE may obtain a mapping relationship from the QoS flow 1 to the DRB 1, namely, a mapping relationship from the uplink QoS flow to the DRB in this manner, and store the mapping relationship.

It should be noted that the QoS rule reflective characteristic of the QoS flow is only a means by which the NAS stratum obtains a TFT and a QoS parameter of the QoS flow. The UE learns, by using the DRB 1 on which a data packet of a downlink QoS flow 1 is located, that the uplink QoS flow 1 is mapped to the DRB 1, and this may be considered as a reflective characteristic of a mapping relationship from a QoS flow to a DRB. The reflective characteristic of the mapping relationship from the QoS flow to the DRB may be configured by the access network device. Specifically, the access network device may notify the UE by using RRC signaling, or notify the UE by using a downlink user plane data packet. To be specific, information indicating that the QoS flow has the reflective characteristic of the mapping relationship from the QoS flow to the DRB is included in a packet header of a downlink data packet.

In addition, it should be noted that the access network device may further change the reflective characteristic that is of a QoS flow and that is of a mapping relationship from the QoS flow to a DRB of the access network device. For example, the access network device may notify, by using RRC signaling or a downlink user plane data packet, the UE to deactivate the reflective characteristic that is of the QoS flow and that is of the mapping relationship from the QoS flow to the DRB of the access network device.

It is worth mentioning that in a service transfer process, a source access network device may notify, by using a message used for a service transfer request, a target access network device whether a QoS flow of UE has a reflective characteristic of a mapping relationship from the QoS flow to a DRB of the source access network device. The target access network device may update or configure, by using an algorithm of the target access network device, a reflective characteristic of a mapping relationship from the QoS flow to a DRB of the target access network device, and notify the source access network device by using a message used to respond to the service transfer request, and the source access network device notifies the UE by using a message used to indicate service transfer. After accessing the target access network device, the UE may determine a DRB for sending a data packet of an uplink QoS flow. If there is an uplink QoS flow for which no corresponding DRB is configured, the UE may send, on a default DRB of the target access network device, a data packet of the QoS flow for which no mapping relationship from the QoS flow to a DRB is configured.

In the QoS flow processing method provided in this embodiment, the access network device may configure the mapping relationship from the QoS flow to the DRB of the access network device for the UE based on the QoS rule reflective characteristic of the QoS flow, thereby ensuring that the QoS flow of the UE is effectively transmitted, providing a more reliable QoS service for a user and ensuring continuity of a user service.

One service flow (QoS flow) is mapped to one DRB, a mapping relationship may be determined by a RAN according to an algorithm, and the mapping relationship may change. In a process of changing a mapping relationship from a QoS flow to a DRB, a data packet that is of the QoS flow and that is sent on a source DRB may arrive at an upper protocol layer earlier than a data packet that is of the QoS flow and that is sent on a new DRB, leading to out-of-order delivery. An embodiment of this application further provides a solution to resolve the out-of-order delivery.

Figure 6:
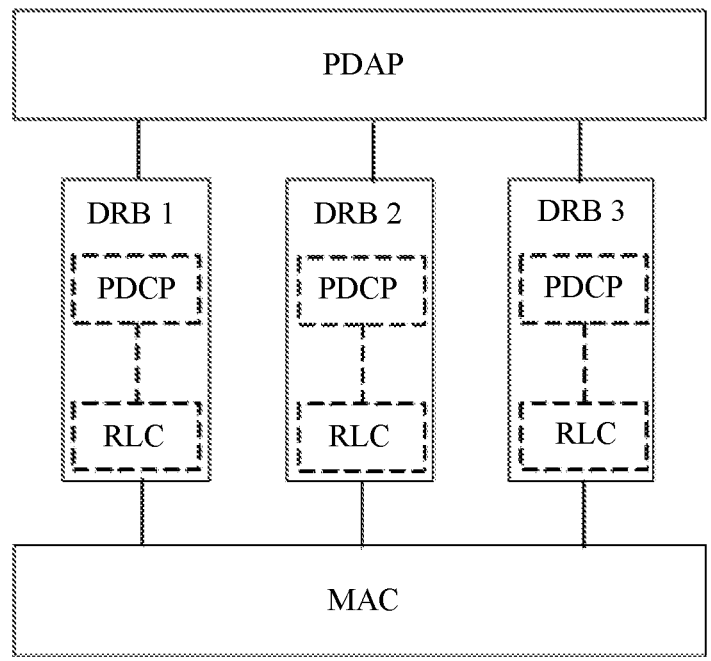
FIG. 6 is a schematic architectural diagram of a protocol stack of an air interface between a radio access network device and a UE.

FIG. 6 is a schematic architectural diagram of a protocol stack of an air interface between a radio access network device and UE. As shown in FIG. 6, in a 5G-RAN, a user plane protocol layer is introduced above a PDCP protocol stack. This protocol layer is responsible for functions, such as routing from a QoS flow to a DRB, adding a QoS flow ID to a user plane packet header, and the like. The protocol layer may be defined as a Packet Data Association Protocol (PDAP). An entity of the protocol stack is configured based on a PDU session. To be specific, one PDAP protocol entity is established for one PDU session.

In solution 1 provided in this embodiment to resolve the out-of-order transmission, the PDAP layer sends an end marker (EM) indication, and there is an interval between sending of data packets.

A PDAP of a first device determines to change a mapping from a first service flow QoS flow 1 to a DRB 1 to a mapping from the QoS flow 1 to a DRB 2. The first device is a transmit end of the QoS flow 1, and a second device is a receive end of the QoS flow 1. The PDAP entity of the first device sends an end marker, where the end marker indicates ending of sending data packets of the QoS flow 1. In other words, the first device no longer sends the data packets of the QoS flow 1 on the DRB 1. The end marker may be sent in a form of a data packet or a control data unit, where an identity of the QoS flow 1 is included. Further, the end marker of the QoS flow may be a plurality of data packets.

If a PDAP entity of the second device receives the end marker of the QoS flow 1, the second device notifies the first device that the end marker of the QoS flow 1 is received. If the first device receives information that is notified by the second device and that indicates that the second device receives the end marker of the QoS flow 1, the first device maps the QoS flow 1 to the DRB 2, and starts to send a data packet of the QoS flow 1 on the DRB 2.

In this manner, the second device first receives a data packet of the QoS flow 1 on the DRB 1, and then receives a data packet on the DRB 2. A PDCP entity of the DRB 1 of the second device delivers PDCP SDUs in-order to an upper layer, and a PDCP entity of the DRB 2 of the second device delivers PDCP SDUs in-order to the upper layer, thereby avoiding out-of-order delivery of data packets of the QoS flow 1.

Further, the mapping from the QoS flow 1 to the DRB 1 is changed to the mapping from the QoS flow 1 to the DRB 2. If the DRB 1 is released before transmission of a data packet of the QoS flow 1 is completed, a packet loss may occur. In this embodiment, if the first device receives the information that is notified by the second device and that indicates that the second device receives the end marker of the QoS flow 1, the first device maps the QoS flow 1 to the DRB 2, and starts to send a data packet of the QoS flow 1 on the DRB 2. The first device may notify that the DRB 1 is no longer used to send a data packet of the QoS flow 1. If the DRB 1 is not used to transmit a data packet of any QoS flow, the DRB 1 may be released.

The first device may be UE or a base station, and the second device may be UE or a base station. If the first device is UE, the second device enforces a mapping relationship from the QoS flow 1 to the DRB 1 or the DRB 2, and changes a mapping relationship that is from a QoS flow to a DRB and that is of the QoS flow 1.

In solution 2 provided in this embodiment to resolve the out-of-order delivery, the PDAP layer sends an end marker (end marker) indication, and there is no interval between sending of data packets.

A PDAP of a first device determines to change a mapping from a first service flow QoS flow 1 to a DRB 1 to a mapping from the QoS flow 1 to a DRB 2. The first device is a transmit end of the QoS flow 1, and a second device is a receive end of the QoS flow 1. The PDAP entity of the first device sends an end marker, where the end marker indicates ending of sending data packets of the QoS flow 1. In other words, the first device no longer sends a data packet of the QoS flow 1 on the DRB 1. The end marker may be sent in a form of a data packet or a control data unit, where an identity of the QoS flow 1 is included. Further, the end marker of the QoS flow may be a plurality of data packets. The PDAP entity of the first device starts to send a data packet of the QoS flow 1 on the DRB 2.

A PDAP entity of the second device receives a data packet of the QoS flow 1 on the DRB 1, and if the PDAP entity receives the end marker of the QoS flow 1, it indicates that transmission of the data packet of the QoS flow 1 on the DRB 1 ends. The PDAP entity of the second device also receives a data packet of the QoS flow 1 on the DRB 2. To ensure in-order delivery of data packets of the QoS flow 1, the PDAP first delivers the data packet of the QoS flow 1 received on the DRB 1, and after receiving the end marker, delivers the data packet of the QoS flow 1 received on the DRB 2.

In this manner, the second device first receives a data packet of the QoS flow 1 on the DRB 1, and then receives a data packet on the DRB 2. A PDCP entity of the DRB 1 of the second device delivers PDCP SDUs in-order to an upper layer, and a PDCP entity of the DRB 2 of the second device delivers PDCP SDUs in-oder to the upper layer. The PDAP entity of the second device first delivers, to an upper layer protocol entity, the data packet of the QoS flow 1 received on the DRB 1, and after receiving the end marker, delivers the data packet of the QoS flow 1 received on the DRB 2, thereby avoiding out-of-order delivery of the data packets of the QoS flow 1.

Further, the PDAP protocol entity may deliver a data packet to the upper layer based on a granularity of the QoS flow. To be specific, for received data packets of different QoS flows, the data packets need to be delivered in-order to the upper layer based on a sequence of the data packets of the QoS flows. For example, if the PDAP protocol entity further includes data packets of a QoS flow 2, the PDAP protocol entity may deliver the data packets based on a sequence of the data packets of the QoS flow 2, instead of being limited to an ordering status or delivery status of the data packets of the QoS flow 1.

Further, the mapping from the QoS flow 1 to the DRB 1 is changed to the mapping from the QoS flow 1 to the DRB 2. If the DRB 1 is released before transmission of a data packet of the QoS flow 1 is completed, a packet loss may occur. In this embodiment, if the first device receives information that is notified by the second device and that indicates that the second device receives an end marker of the QoS flow 1, the first device maps the QoS flow 1 to the DRB 2, and starts to send a data packet of the QoS flow 1 on the DRB 2. The first device may notify that the DRB 1 is no longer used to send data packets of the QoS flow 1. If the DRB 1 is not used to transmit a data packet of any QoS flow, the DRB 1 may be released.

In solution 3 provided in this embodiment to resolve the out-of-order delivery, a PDAP layer sends an end marker (end marker) indication to a PDCP layer, and there is no interval between sending of data packets.

Figure 7:
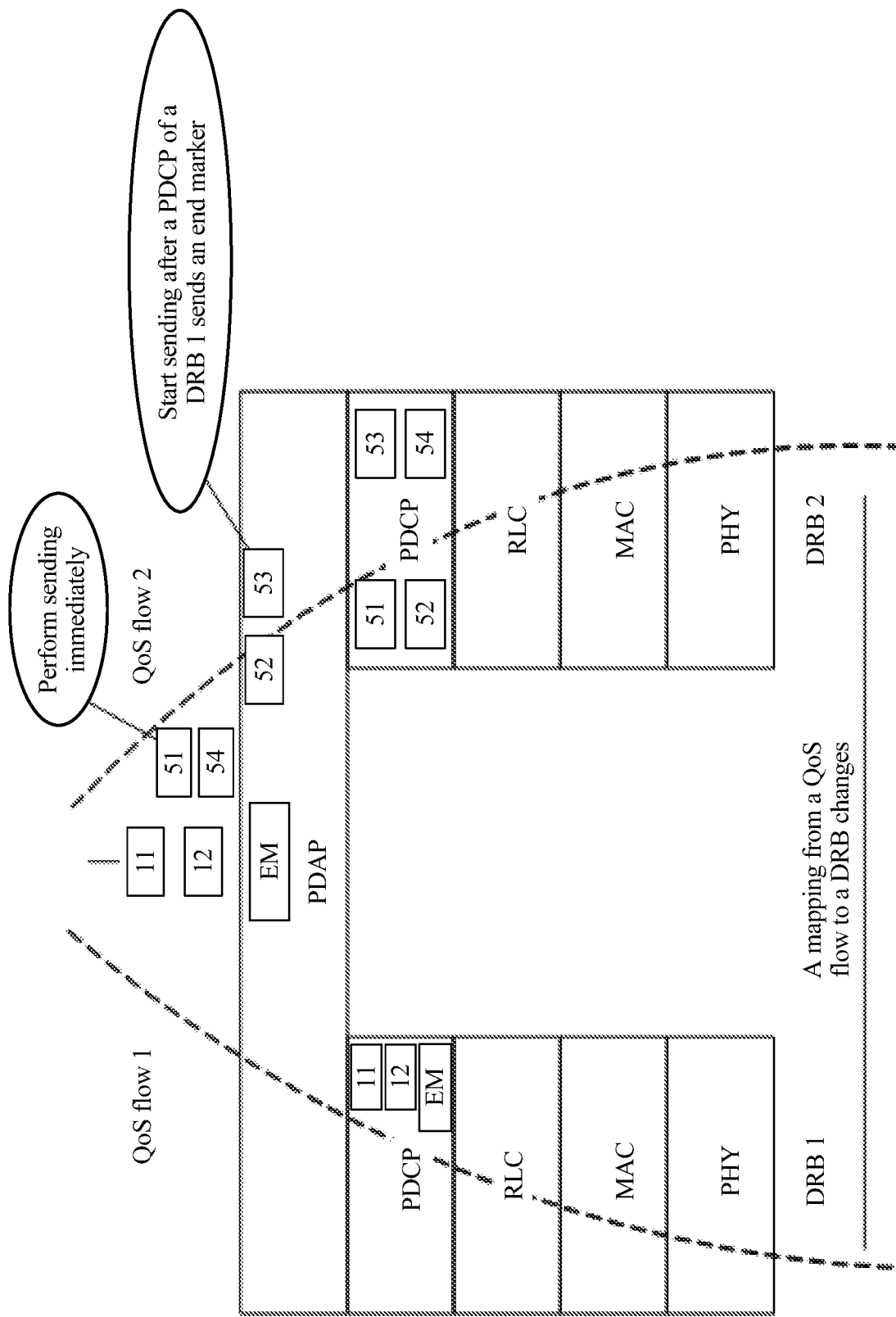
FIG. 7 is a schematic diagram showing a change in a mapping relationship from a QoS flow to a DRB.

FIG. 7 is a schematic diagram showing a change of a mapping relationship from a QoS flow to a DRB. As shown in FIG. 7, data packets of a QoS flow 1 are first transmitted on a DRB 1, and are then transmitted on a DRB 2 after the service flow is re-mapped to a DRB. A PDCP entity 1 of a transmit end and a PDCP entity 2 of the transmit end separately allocate PDCP SNs to data packets of the QoS flow 1. A packet 11, a packet 12, a packet 52, and a packet 53 are data packets of the QoS flow 1. The packet 11 and the packet 12 are data packets received by a PDCP entity 1 of a receive end, and the packet 52 and the packet 53 are data packets received by a PDCP entity 2 of the receive end. A packet 51 and a packet 54 are data packets of a QoS flow 2.

When transferring the QoS flow 1 from the DRB 1 to the DRB 2, the transmit end sets an end marker, to indicate ending of transmission of data of the flow 1 on the DRB 1. The end marker may be a PDCP SN number or another identity indicating ending of the data of the flow 1. If a new protocol layer PDAP protocol entity of the transmit end determines to change a mapping from the flow 1 to the DRB 1 to a mapping from the flow 1 to the DRB 2, the PDAP protocol entity of the transmit end notifies a new protocol layer PDAP protocol entity of the receive end of indication information indicating that the mapping relationship that is from the QoS flow to the DRB and that is of the flow 1 is changed. The indication information indicating that the mapping relationship from the QoS flow to the DRB is changed includes an ID of the QoS flow 1 and an identity of a new DRB to which the QoS flow 1 is mapped, for example, the DRB 2.

The new protocol layer entity of the transmit end further notifies a lower-layer protocol entity, for example, a PDCP entity, of an end marker of data packets of the QoS flow 1 sent on the DRB 1, and may notify the PDCP entity by using an inter-layer primitive. The PDCP protocol entity of the transmit end may set an end marker of the PDCP layer, for example, based on the end marker of sending of the data of the QoS flow 1 notified by the new protocol layer, or the PDCP protocol entity of the transmit end may set an end marker of the PDCP layer according to status feedback of the receive end. The transmit end may further set a timer and notify the receive end. If the receive end does not send feedback after the timer expires, the transmit end sets an end marker and sends the end marker to the receive end. The receive end may be notified of the end marker of data packet sending by including the end marker in a header of a user plane data packet, or by using a control protocol data unit. The PDCP protocol entity of the transmit end sends the end marker to an upper-layer PDAP protocol entity of the transmit end, for example, by using an inter-layer primitive.

Further, the PDAP protocol entity of the transmit end may start to send data on a new DRB after receiving indication information indicating that the PDCP entity of the transmit end has successfully sent an old data packet. The successful sending of the old data packet means that the PDCP entity has successfully sent a data packet of the QoS flow 1 to the PDCP entity of the receive end, or sending of the data packet times out.

The PDCP entity of the receive end receives the end marker of the QoS flow 1, and sends the end marker to the new protocol layer PDAP protocol entity. The PDAP protocol entity of the receive end receives a data packet of the QoS flow 1 from the PDCP protocol entity 1 of the receive end, and receives a data packet of the flow 1 from the PDCP protocol entity 2 of the receive end. The PDAP protocol entity of the receive end performs a ordering function. To be specific, the PDAP protocol entity first delivers in-order to an upper layer the data packets of the QoS flow 1 that are received from the PDCP protocol entity 1 before the end marker, and then delivers in-order to the upper layer the data packets of the QoS flow 1 that are received from the PDCP protocol entity 2. That is, the packet 11 and the packet 12 are first delivered, and then the packet 52 and the packet 53 are delivered. Further, the new protocol layer PDAP protocol entity receives the data packets of the QoS flow 2 from the PDCP protocol entity 2, and the new protocol layer PDAP protocol entity may deliver the data packets to an upper layer based on a delivery rule of the data packets of the QoS flow 2, instead of being limited by ordering of sequence numbers of the data packets of the QoS flow 1. For example, the QoS flow 2 is transmitted only in the PDCP protocol entity 2, and the PDAP protocol entity may deliver the packet 51 and the packet 54 to the upper protocol layer. However, because the PDAP protocol entity needs to wait for receiving of the packet 12 of the QoS flow 1, the packet 52 may be still in a buffer of the PDAP protocol entity of the receive end. In other words, the PDAP layer may implement in-order delivery based on a sequence of a QoS flow, instead of in-order delivery to an upper layer entirely based on an ordering of PDCP SNs.

Further, if the ordering function of the PDAP protocol entity is implemented at the PDCP layer, the PDCP 2 delivers the packet 52 and the packet 53 after the PDCP 1 finishes delivering the packet 11 and the packet 12. Likewise, delivery of a data packet of the flow 2 in the PDCP 2 is not affected by a process of ordering the data packets of the flow 1.

It should be noted that the data packets in the method of the foregoing process may be uplink data packets, or may be downlink data packets. This is not limited in this embodiment of this application.

In another embodiment of this application, a PDAP protocol layer configuration method is further provided.

As shown in FIG. 6, in a 5G-RAN, a user plane protocol layer is introduced above a PDCP protocol stack. This protocol layer is responsible for functions such as routing from a QoS flow to a DRB, adding a QoS flow ID to a user plane packet header, and the like. The protocol layer may be defined as a PDAP. An entity of the protocol stack is configured based on a PDU session. To be specific, one PDAP protocol entity is established for one PDU session. The PDAP is further responsible for delivering, based on the session, data packets received on a DRB 1 and a DRB 2. For example, a PDAP entity of UE delivers a received downlink data packet to an application layer instance corresponding to the session, and a PDAP entity of a radio access network device delivers a received uplink data packet to a tunnel, where the tunnel corresponds to the session and is connected to a core network user plane network element.

The UE may initiate establishment of a PDU session. During a process of the session establishment, the radio access network device establishes a default DRB and a PDAP entity for the UE, and may establish a dedicated DRB. When needing to send uplink data, an access stratum (AS) of the UE sends, based on QoS flow ID information provided by a non-access stratum (NAS) for each uplink data packet and a mapping relationship that is from a QoS flow ID to a DRB and that is stored by the AS stratum, each uplink data packet on a corresponding DRB. If the NAS stratum does not provide QoS flow ID information for a particular uplink data packet, the AS stratum of the UE sends the uplink data on a default DRB of a corresponding PDU session. The radio access network device may establish a DRB for a QoS flow of the UE, and notify the UE of a mapping relationship from the QoS flow to the DRB. The UE transmits a data packet of the QoS flow on the corresponding DRB based on the mapping relationship from the QoS flow to the DRB.

The radio access network device notifies the UE of configuration information of a DRB and configuration information of a PDAP by configuring dedicated radio resource configuration information for the UE. The radio access network device may further add, modify, or delete the configuration information of the DRB and the configuration information of the PDAP by configuring dedicated radio resource configuration information.

This embodiment of this application provides the following several optional radio resource configuration manners.

In a first optional radio resource configuration manner, the radio access network device sends dedicated radio resource configuration information to the UE. The dedicated radio resource configuration information includes configuration information of a DRB, and the configuration information of the DRB includes identity information of the DRB, and further includes at least one of the following: identity information of a PDU session corresponding to the DRB, indication information indicating whether the DRB is a default DRB, or protocol layer configuration information of the DRB. The PDU session corresponding to the DRB is a PDU session to which a QoS flow included on the DRB belongs. A type of the default DRB means that the DRB is a default DRB. The protocol layer configuration information of the DRB is parameter configuration of at least one of the following: a PDCP layer of the DRB, an RLC layer of the DRB, or a logical channel of the DRB.

Further, the dedicated radio resource configuration information includes configuration information of a PDAP protocol layer, and the configuration information of the PDAP protocol layer includes at least one of the following: identity information of a PDAP protocol entity, identity information of a PDU session corresponding to the PDAP protocol entity, identity information of a default DRB, or a mapping relationship between a QoS flow and a DRB. The identity information of the default DRB is used to indicate a default DRB identity of the PDU session corresponding to the PDAP protocol entity.

The UE receives the configuration information of the DRB and the configuration information of the PDAP that are configured by the radio access network device, and may learn, through a correspondence between the PDU session and the DRB and a correspondence between the PDU session and the PDAP, a correspondence between the PDAP and the DRB. The UE may learn a default DRB of each session, based on the indication information that is in the configuration information of the DRB and that indicates whether the DRB is a default DRB or the identity information of the default DRB in the configuration information of the PDAP.

For example, a DRB 1 and a DRB 2 correspond to a session 1, and a PDAP 1 corresponds to the session 1, then the PDAP 1 corresponds to the DRB 1 and the DRB 2. The PDAP 1 is responsible for mapping QoS flows in the session 1 to the DRB 1 and the DRB 2, and the PDAP 1 is also responsible for adding QoS flow IDs to data packets mapped to the DRB 1 and the DRB 2.

For example, a signaling element for performing radio resource configuration is:

```
DRB add or modify{
    DRB id, namely, an expression of "the identity information of the DRB";
    DRB Session id, namely, an expression of "the identity information of
the PDU Session corresponding to the DRB";
    Default DRB indicator, namely, an expression of "the indication
information indicating whether the DRB is the default DRB";
    Other protocol configuration;
}
PDAP add or modify
{
    PDAP id, namely, an expression of "the identity information of the
PDAP protocol entity";
    Session id, namely, an expression of "the identity information of the
PDU session corresponding to the PDAP protocol entity";
    default DRB id, namely, an expression of "the identity information of the
default DRB";
    Flow to DRB mapping configuration, namely, an expression of "the
mapping relationship between the QoS flow and the DRB";
}
```

In a second optional radio resource configuration manner, the radio access network device sends dedicated radio resource configuration information to the UE. The dedicated radio resource configuration information includes configuration information of a DRB, and the configuration information of the DRB includes identity information of the DRB, and further includes at least one of the following: identity information of a PDU session corresponding to the DRB, protocol layer configuration information of the DRB, or configuration information of a PDAP protocol layer. The PDU session corresponding to the DRB is a PDU session to which a QoS flow included on the DRB belongs. The protocol layer configuration information of the DRB is parameter configuration of at least one of: a PDCP layer of the DRB, an RLC layer of the DRB, or a logical channel of the DRB. The configuration information of the PDAP protocol layer includes at least one of identity information of a PDAP protocol entity or a mapping relationship between a QoS flow and a DRB.

In all DRBs corresponding to each session, configuration information of only one DRB includes the configuration information of the PDAP protocol layer, and the DRB is a default DRB.

The UE receives the configuration information of the DRB notified by the radio access network device, and may learn, through a correspondence between the session corresponding to the DRB and the configuration information of the PDAP protocol layer included in the configuration information of the DRB, that the DRB is a default DRB, and learn a PDU session corresponding to the PDAP.

For example, a DRB 1 and a DRB 2 correspond to a session 1, and configuration information of the DRB 1 includes configuration information of a PDAP 1, then the DRB 1 is a default DRB of the session 1, and the PDAP 1 corresponds to the session 1. Then, the PDAP 1 is responsible for mapping QoS flows in the session 1 to the DRB 1 and the DRB 2. The PDAP 1 is responsible for adding QoS flow IDs to data packets mapped to the DRB 1 and the DRB 2.

For example, a signaling element for performing radio resource configuration is:

```
DRB1 add or modify{
  DRB id;
  Session id;
  Other protocol configuration;
  PDAP{
    PDAP id;
    Flow to DRB mapping configuration;}
}
```

-continued

```
DRB2 add or modify{
  DRB id;
  Session id;
}
```

In a third optional radio resource configuration manner, the radio access network device sends dedicated radio resource configuration information to the UE. The dedicated radio resource configuration information includes configuration information of a session, and the configuration information of the session includes at least one of the following: a session identity, configuration information of a DRB, or configuration information of a PDAP protocol layer.

The configuration information of the DRB is configuration information of a DRB corresponding to the session, and includes at least one of the following: identity information of the DRB, indication information indicating whether the DRB is a default DRB, or protocol layer configuration information of the DRB. The protocol layer configuration information of the DRB is parameter configuration of at least one of the following: a PDCP layer of the DRB, an RLC layer of the DRB, or a logical channel of the DRB.

The configuration information of the PDAP protocol layer includes at least one of the following: identity information of a PDAP protocol entity, identity information of the default DRB, or a mapping relationship between a QoS flow and a DRB. The identity information of the default DRB is used to indicate a default DRB identity of a PDU session corresponding to the PDAP protocol entity.

The UE receives the configuration information that is of the session and that is configured by the radio access network device, to obtain the configuration information of the DRB corresponding to the session and the configuration information of the PDAP protocol layer corresponding to the session. The UE may learn a default DRB of each session, based on the indication information that is used to indicate whether the DRB is the default DRB and that is in the configuration information of the DRB or the identity information of the default DRB in the configuration information of the PDAP.

For example, a session 1 corresponds to a DRB 1 and a DRB 2, the session 1 corresponds to a PDAP 1, then the PDAP 1 corresponds to the DRB 1 and the DRB 2. Then, the PDAP 1 is responsible for mapping QoS flows in the session 1 to the DRB 1 and the DRB 2. The PDAP 1 is also responsible for adding QoS flow IDs to data packets mapped to the DRB 1 and the DRB 2.

For example, a signaling element for performing radio resource configuration is:

```
Session add or modify{
  DRB id list;
  PDAP configuration;
}
DRB add or modify{
  DRB id;
  Default DRB, optional
  Other protocol configuration;
}
PDAP configuration
{
  PDAP id;
  Flow to DRB mapping configuration;
  default DRB id, namely, an expression of "the identity information of the default DRB";
}
```

In a fourth optional radio resource configuration manner, the radio access network device sends dedicated radio resource configuration information to the UE. The dedicated radio resource configuration information includes configuration information of a session, and the configuration information of the session includes at least one of identity information of the session or configuration information of a DRB.

The configuration information of the DRB is configuration information of a DRB corresponding to the session, and includes at least one of the following: identity information of the DRB, configuration information of a PDAP protocol layer, or protocol layer configuration information of the DRB. The protocol layer configuration information of the DRB is parameter configuration of at least one of the following: a PDCP layer of the DRB, an RLC layer of the DRB, or a logical channel of the DRB. The configuration information of the PDAP protocol layer includes at least one of identity information of a PDAP protocol entity or a mapping relationship between a QoS flow and a DRB.

In all DRBs corresponding to each session, configuration information of only one DRB includes the configuration information of the PDAP protocol layer, and the DRB is a default DRB.

The UE receives the configuration information that is of the session and that is configured by the radio access network device, to obtain the configuration information of the DRB corresponding to the session and the configuration information of the PDAP protocol layer corresponding to the session. For example, a session 1 corresponds to a DRB 1 and a DRB 2, the session 1 corresponds to a PDAP 1, then the PDAP 1 corresponds to the DRB 1 and the DRB 2. Then, the PDAP 1 is responsible for mapping QoS flows in the session 1 to the DRB 1 and the DRB 2. The PDAP 1 is also responsible for adding QoS flow IDs to data packets mapped to the DRB 1 and the DRB 2. If configuration information of the DRB 1 includes configuration information of the PDAP 1, then the DRB 1 is a default DRB.

For example, a signaling element for performing radio resource configuration is:

```
Session add or modify{
  DRB id list;
}
DRB add or modify{
  DRB id;
  PDAP configuration, optional;
  Other protocol configuration;
}
PDAP configuration
{
  PDAP id;
  Flow to DRB mapping configuration;
}
```

The radio resource configuration solution provided in this embodiment may be used by the radio access network device to configure a DRB and an SRB in a primary cell or a secondary cell, and may be applied to a plurality of scenarios such as an RRC process, a handover process, and addition, release, or modifying process of a multi-connectivity service.

Figure 8:
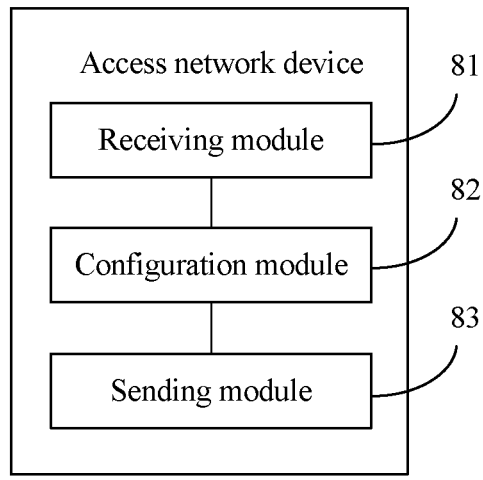
FIG. 8 is a schematic structural diagram of an access network device according to an embodiment of this application.

FIG. 8 is a schematic structural diagram of an access network device according to an embodiment of this application. As shown in FIG. 8, the access network device includes a QoS flow processing device. The QoS flow processing device may be implemented as a part or all of the access network device (for example, a base station) by using software, hardware, or a combination of software and hardware. The device may include a receiving module 81, a configuration module 82, and a sending module 83.

Specifically, the receiving module 81 is configured to receive a message used for a service transfer request, where the message used for the service transfer request is sent by a first access network device and includes configuration information of a QoS flow, and the configuration information includes at least one of the following: first indication information, where the first indication information indicates a QoS rule reflective characteristic of the QoS flow; second indication information, where the second indication information indicates a first manner in which the first access network device obtains the QoS rule reflective characteristic of the QoS flow; third indication information, where the third indication information indicates a second manner in which the first access network device notifies a user equipment UE of the QoS rule reflective characteristic of the QoS flow; fourth indication information, where the fourth indication information indicates a first mapping relationship that is from the QoS flow to a data radio bearer DRB of the first access network device and that is used when the UE sends the QoS flow to the first access network device; fifth indication information, where the fifth indication information indicates that a manner in which the first access network device configures the first mapping relationship for the UE is a user plane configuration manner or a control plane configuration manner; sixth indication information, where the sixth indication information indicates priorities that are between the user plane configuration manner and the control plane configuration manner and that are set by the first access network device for the UE; seventh indication information, where the seventh indication information indicates that the UE is to release the mapping relationship that is from the QoS flow to the DRB of the first access network device and that is configured by the first access network device in the user plane configuration manner; or eighth indication information, where the eighth indication information indicates a reflective characteristic of the DRB of the first access network device. The configuration module 82 is configured to configure a mapping relationship from the QoS flow to a DRB of a second access network device for the UE based on the configuration information. The sending module 83 is configured to send, to the first access network device, a message that is used to respond to the service transfer request and includes the mapping relationship configured by the configuration module 82 for the UE, where the message used to respond to the service transfer request is a message used to indicate service transfer and sent by the first access network device to the UE, and the message used to indicate the service transfer instructs the UE to map, based on the message used to indicate the service transfer, the QoS flow of at least one service to the DRB of the second access network device for transmission.

Possibly, the configuration information includes the first indication information, and the configuration module 82 is specifically configured to send a downlink data packet including the first indication information in the DRB of the second access network device to which the QoS flow is mapped, so that the second access network device configures the mapping relationship from the QoS flow to the DRB of the second access network device for the UE.

Possibly, the configuration information includes the third indication information, and the second manner is: notifying the UE of the QoS rule reflective characteristic of the QoS flow by including indication information in a downlink data packet, or notifying the UE of the QoS rule reflective characteristic of the QoS flow by using a user plane control data unit. The configuration module 82 is specifically configured to notify the UE of the QoS rule reflective characteristic of the QoS flow in the second manner indicated in the third indication information, so that the second access network device configures the mapping relationship from the QoS flow to the DRB of the second access network device for the UE.

Possibly, the configuration information further includes the second indication information, the first manner is: obtaining the QoS rule reflective characteristic of the QoS flow by using control signaling between the first access network device and a core network, or obtaining the QoS rule reflective characteristic of the QoS flow by using indication information included in a downlink user data packet between the first access network device and the core network, and the second indication information indicates that the first access network device obtains the QoS rule reflective characteristic of the QoS flow by using the indication information included in the downlink user data packet between the first access network device and the core network. The configuration module 82 is specifically configured to notify the UE of the QoS rule reflective characteristic of the QoS flow in the second manner indicated in the third indication information, so that the second access network device configures the mapping relationship from the QoS flow to the DRB of the second access network device for the UE.

Possibly, the configuration information includes the seventh indication information, and the user plane configuration manner is: configuring the mapping relationship from the QoS flow to the DRB for the UE by using indication information included in a downlink data packet, or configuring the mapping relationship from the QoS flow to the DRB for the UE by using a user plane control data unit. The configuration module 82 is specifically configured to configure, for the QoS flow in the mapping relationship that is from the QoS flow to the DRB of the first access network device and that is configured by the first access network device for the UE in the user plane configuration manner, a second mapping relationship from the QoS flow to the DRB of the second access network device. The sending module 83 is specifically configured to send, to the first access network device, a message that is used to respond to the service transfer request and that includes the second mapping relationship.

Further, the configuration module is specifically configured to configure, for the QoS flow in the mapping relationship that is from the QoS flow to the DRB of the first access network device and that is configured by the first access network device for the UE in the user plane configuration manner, the second mapping relationship from the QoS flow to the DRB of the second access network device in the user plane configuration manner or in the control plane configuration manner, where the control plane configuration manner is: configuring the mapping relationship from the QoS flow to the DRB for the UE by using radio resource control RRC signaling.

Possibly, the configuration information includes the fourth indication information; and the configuration module 82 is specifically configured to update the first mapping relationship based on the fourth indication information, to obtain a third mapping relationship from the QoS flow to the DRB of the second access network device. The sending module 83 is specifically configured to send, to the first access network device, a message that is used to respond to the service transfer request and that includes the third mapping relationship.

Possibly, the configuration information further includes the fifth indication information; and the configuration module 82 is specifically configured to update the first mapping relationship based on the fourth indication information and the fifth indication information, so as to obtain a fourth mapping relationship from the QoS flow to the DRB of the second access network device. The sending module 83 is specifically configured to send, to the first access network device, a message that is used to respond to the service transfer request and that includes the fourth mapping relationship.

Possibly, the configuration information includes the sixth indication information; and the configuration module 82 is specifically configured to configure a fifth mapping relationship from the QoS flow to the DRB of the second access network device for the UE based on the sixth indication information. The sending module 83 is specifically configured to send, to the first access network device, a message that is used to respond to the service transfer request and that includes the fifth mapping relationship.

Possibly, the configuration module 82 is specifically further configured to update the priorities between the user plane configuration manner and the control plane configuration manner in the UE based on the sixth indication information. Further, the sending module 83 is specifically further configured to send, to the first access network device, the message that is used to respond to the service transfer request and that includes the updated priorities betweeen the user plane configuration manner and the control plane configuration manner.

Possibly, the message used to respond to the service transfer request includes at least one of the updated priorities between the user plane configuration manner and the control plane configuration manner or the fifth mapping relationship.

Possibly, the configuration information includes the eighth indication information; and the configuration module 82 is specifically configured to: set a reflective characteristic of the DRB of the second access network device based on the eighth indication information; and configure the mapping relationship from the QoS flow to the DRB of the second access network device for the UE in the user plane configuration manner. The user plane configuration manner is: configuring the mapping relationship from the QoS flow to the DRB for the UE by using indication information included in a downlink data packet, or configuring the mapping relationship from the QoS flow to the DRB for the UE by using a user plane control data unit. Further, the message used to respond to the service transfer request further includes indication information of the reflective characteristic of the DRB of the second access network device.

In actual application, optionally, the receiving module 81 may be further configured to receive a packet data convergence protocol sequence number PDCP SN status report that is sent by the first access network device for the DRB of the first access network device to which the QoS flow is mapped, where the PDCP SN status report includes the first indication information.

In actual application, optionally, the receiving module 81 may be further configured to receive a downlink data packet that needs to be forwarded and that is sent by the first access network device, where an encapsulation header of the downlink data packet that needs to be forwarded includes the first indication information.

The QoS flow processing device provided in this embodiment may perform the functions performed by the second access network device in the method embodiments. Implementation principles and technical effects thereof are similar, and details are not described herein again.

Figure 9:
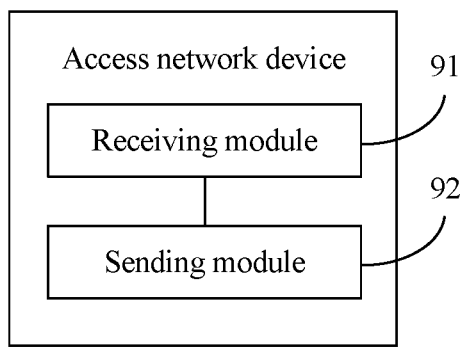
FIG. 9 is another schematic structural diagram of an access network device according to an embodiment of this application.

FIG. 9 is a schematic structural diagram of an access network device according to an embodiment of this application. As shown in FIG. 9, the access network device includes a QoS flow processing device. The QoS flow processing device may be implemented as a part or all of the access network device (for example, a base station) by using software, hardware, or a combination of software and hardware. The device may include a sending module 91 and a receiving module 92.

Specifically, the sending module 91 is configured to send a message used for a service transfer request to a second access network device, where the message used for the service transfer request includes configuration information of a QoS flow. The configuration information includes at least one of the following: first indication information, where the first indication information indicates a QoS rule reflective characteristic of the QoS flow; second indication information, where the second indication information indicates a first manner in which the first access network device obtains the QoS rule reflective characteristic of the QoS flow; third indication information, where the third indication information indicates a second manner in which the first access network device notifies user equipment UE of the QoS rule reflective characteristic of the QoS flow; fourth indication information, where the fourth indication information indicates a first mapping relationship that is from the QoS flow to a data radio bearer DRB of the first access network device and that is used when the UE sends the QoS flow to the first access network device; fifth indication information, where the fifth indication information indicates that a manner in which the first access network device configures the first mapping relationship for the UE is a user plane configuration manner or a control plane configuration manner; sixth indication information, where the sixth indication information indicates priorities that are between the user plane configuration manner and the control plane configuration manner and that are set by the first access network device for the UE; seventh indication information, where the seventh indication information indicates that the UE is to release the mapping relationship that is from the QoS flow to the DRB of the first access network device and that is configured by the first access network device in the user plane configuration manner; or eighth indication information, where the eighth indication information indicates a reflective characteristic of the DRB of the first access network device. The receiving module 92 is configured to receive a message that is used to respond to the service transfer request, where the message includes the mapping relationship configured by the second access network device for the UE and is sent by the second access network device. The sending module 91 is further configured to send, to the UE, a message that is used to indicate service transfer and includes the mapping relationship configured by the second access network device for the UE, where the message used to indicate the service transfer instructs the UE to map, based on the indication message, the QoS flow of at least one service to the DRB of the second access network device for transmission.

In actual application, the first manner may be: obtaining the QoS rule reflective characteristic of the QoS flow by using control signaling between the access network device and a core network; or may be: obtaining the QoS rule reflective characteristic of the QoS flow by using indication information included in a downlink user data packet between the access network device and the core network.

In actual application, the second manner may be: notifying the UE of the QoS rule reflective characteristic of the QoS flow by including indication information in a downlink data packet; or may be: notifying the UE of the QoS rule reflective characteristic of the QoS flow by using a user plane control data unit.

In actual application, the user plane configuration manner may be: configuring the mapping relationship from the QoS flow to the DRB for the UE by using indication information included in a downlink data packet, or configuring the mapping relationship from the QoS flow to the DRB for the UE by using a user plane control data unit; and the control plane configuration manner may be: configuring the mapping relationship from the QoS flow to the DRB for the UE by using radio resource control RRC signaling.

In actual application, the sending module 91 may be further configured to send, to the second access network device, a packet data convergence protocol sequence number PDCP SN status report for the DRB of the first access network device to which the QoS flow is mapped, where the PDCP SN status report includes the first indication information.

In actual application, the sending module 91 may be further configured to send, to the second access network device, a downlink data packet that needs to be forwarded, where an encapsulation header of the downlink data packet that needs to be forwarded includes the first indication information.

The QoS flow processing device provided in this embodiment may perform the functions performed by the first access network device in the method embodiments. Implementation principles and technical effects thereof are similar, and details are not described herein again.

Figure 10:
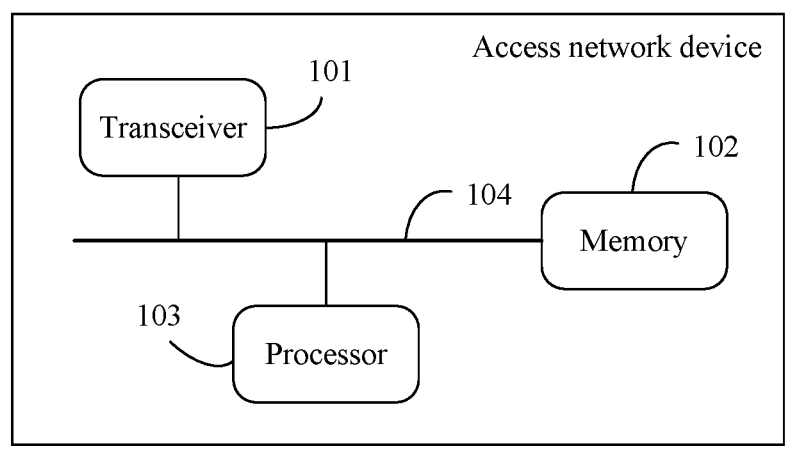
FIG. 10 is another schematic structural diagram of an access network device according to an embodiment of this application.

FIG. 10 is a schematic structural diagram of an access network device according to an embodiment of this application. As shown in FIG. 10, the access network device includes a transceiver 101, a memory 102, a processor 103, and at least one communications bus 104.

The memory 102 stores a software program, the memory 102 may include a high-speed RAM memory, or a non-volatile memory NVM, for example, at least one magnetic memory, and the memory 102 may store various programs to implement various processing functions and implement steps of a method in this embodiment. The processor 103 is coupled to the memory 102, and the communications bus 104 is configured to implement communication connection between elements. Optionally, the transceiver 101 in this embodiment may be a radio frequency module or a baseband module of the access network device.

In this embodiment, the processor 103 runs the software program in the memory 102 to implement a corresponding function in the QoS flow processing method.

Specifically, the transceiver 101 is configured to receive a message used for a service transfer request, where the message used for the service transfer request is sent by a first access network device and includes configuration information of a QoS flow, and the configuration information includes at least one of the following: first indication information, where the first indication information indicates a QoS rule reflective characteristic of the QoS flow; second indication information, where the second indication information indicates a first manner in which the first access network device obtains the QoS rule reflective characteristic of the QoS flow; third indication information, where the third indication information indicates a second manner in which the first access network device notifies user equipment UE of the QoS rule reflective characteristic of the QoS flow; fourth indication information, where the fourth indication information indicates a first mapping relationship that is from the QoS flow to a data radio bearer DRB of the first access network device and that is used when the UE sends the QoS flow to the first access network device; fifth indication information, where the fifth indication information indicates that a manner in which the first access network device configures the first mapping relationship for the UE is a user plane configuration manner or a control plane configuration manner; sixth indication information, where the sixth indication information indicates priorities that are between the user plane configuration manner and the control plane configuration manner and that are set by the first access network device for the UE; seventh indication information, where the seventh indication information indicates that the UE is to release the mapping relationship that is from the QoS flow to the DRB of the first access network device and that is configured by the first access network device in the user plane configuration manner; or eighth indication information, where the eighth indication information indicates a reflective characteristic of the DRB of the first access network device. The processor 103 is configured to configure a mapping relationship from the QoS flow to a DRB of the access network device for the UE based on the configuration information. The transceiver 101 is further configured to send a message used to respond to the service transfer request to the first access network device, where the message used to respond to the service transfer request is a message used to indicate service transfer and sent by the first access network device to the UE, and the message used to indicate the service transfer instructs the UE to map, based on the message used to indicate the service transfer, the QoS flow of at least one service to the DRB of the access network device for transmission.

Possibly, the configuration information includes the first indication information, and the processor 103 is specifically configured to send a downlink data packet including the first indication information in the DRB of the access network device to which the QoS flow is mapped, so that the second access network device configures the mapping relationship from the QoS flow to the DRB of the access network device for the UE.

Possibly, the configuration information includes the third indication information, and the second manner is: notifying the UE of the QoS rule reflective characteristic of the QoS flow by including indication information in a downlink data packet, or notifying the UE of the QoS rule reflective characteristic of the QoS flow by using a user plane control data unit. The processor 103 is specifically configured to notify the UE of the QoS rule reflective characteristic of the QoS flow in the second manner indicated in the third indication information, so that the second access network device configures the mapping relationship from the QoS flow to the DRB of the access network device for the UE.

Possibly, the configuration information further includes the second indication information, the first manner is: obtaining the QoS rule reflective characteristic of the QoS flow by using control signaling between the first access network device and a core network, or obtaining the QoS rule reflective characteristic of the QoS flow by using indication information inlcluded in a downlink user data packet between the first access network device and the core network, and the second indication information indicates that the first access network device obtains the QoS rule reflective characteristic of the QoS flow by using the indication information included in the downlink user data packet between the first access network device and the core network. The processor 103 is specifically configured to notify the UE of the QoS rule reflective characteristic of the QoS flow in the second manner indicated in the third indication information, so that the second access network device configures the mapping relationship from the QoS flow to the DRB of the access network device for the UE.

Possibly, the configuration information includes the seventh indication information, and the user plane configuration manner is: configuring the mapping relationship from the QoS flow to the DRB for the UE by using indication information included in a downlink data packet, or configuring the mapping relationship from the QoS flow to the DRB for the UE by using a user plane control data unit. The processor 103 is specifically configured to configure, for the QoS flow in the mapping relationship that is from the QoS flow to the DRB of the first access network device and that is configured by the first access network device for the UE in the user plane configuration manner, a second mapping relationship from the QoS flow to the DRB of the access network device. The transceiver 101 is specifically configured to send, to the first access network device, a message that is used to respond to the service transfer request and that includes the second mapping relationship.

Further, the processor 103 is specifically configured to configure, for the QoS flow in the mapping relationship that is from the QoS flow to the DRB of the first access network device and that is configured by the first access network device for the UE in the user plane configuration manner, the second mapping relationship from the QoS flow to the DRB of the access network device in the user plane configuration manner or the control plane configuration manner, where the control plane configuration manner is: configuring the mapping relationship from the QoS flow to the DRB for the UE by using radio resource control RRC signaling.

Possibly, the configuration information includes the fourth indication information; and the processor 103 is specifically configured to update the first mapping relationship based on the fourth indication information, so as to obtain a third mapping relationship from the QoS flow to the DRB of the access network device. The transceiver 101 is specifically configured to send, to the first access network device, a message that is used to respond to the service transfer request and that includes the third mapping relationship.

Possibly, the configuration information further includes the fifth indication information; and the processor 103 is specifically configured to update the first mapping relationship based on the fourth indication information and the fifth indication information, so as to obtain a fourth mapping relationship from the QoS flow to the DRB of the access network device. The transceiver 101 is specifically configured to send, to the first access network device, a message that is used to respond to the service transfer request and that includes the fourth mapping relationship.

Possibly, the configuration information includes the sixth indication information; and the processor 103 is specifically configured to configure a fifth mapping relationship from the QoS flow to the DRB of the access network device for the UE based on the sixth indication information. The transceiver 101 sends, to the first access network device, a message that is used to respond to the service transfer request and that includes the fifth mapping relationship.

Possibly, the processor 103 is specifically further configured to update the priorities between the user plane configuration manner and the control plane configuration manner in the UE based on the sixth indication information. Further, the transceiver 101 is specifically further configured to send, to the first access network device, the message that is used to respond to the service transfer request and that includes the updated priorities between the user plane configuration manner and the control plane configuration manner.

Possibly, the message used to respond to the service transfer request includes at least one of the updated priorities between the user plane configuration manner and the control plane configuration manner or the fifth mapping relationship.

Possibly, the configuration information includes the eighth indication information; and the processor 103 is specifically configured to: set a reflective characteristic of the DRB of the second access network device based on the eighth indication information; and configure the mapping relationship from the QoS flow to the DRB of the second access network device for the UE in the user plane configuration manner, where the user plane configuration manner is: configuring the mapping relationship from the QoS flow to the DRB for the UE by using indication information included in a downlink data packet, or configuring the mapping relationship from the QoS flow to the DRB for the UE by using a user plane control data unit. The transceiver 101 is specifically configured to send, to the first access network device, the message that is used to respond to the service transfer request and that includes the indication information of the reflective characteristic of the DRB of the second access network device and the mapping relationship that is from the QoS flow to the DRB of the second access network device and that is configured by the second access network device for the UE in the user plane configuration manner.

In actual application, the transceiver 101 may be further configured to receive a packet data convergence protocol sequence number PDCP SN status report that is sent by the first access network device for the DRB of the first access network device to which the QoS flow is mapped, where the PDCP SN status report includes the first indication information.

In actual application, the transceiver 101 may be further configured to receive a downlink data packet that needs to be forwarded and that is sent by the first access network device, where an encapsulation header of the downlink data packet that needs to be forwarded includes the first indication information.

The access network device provided in this embodiment of this application may perform the method embodiments. Implementation principles and technical effects thereof are similar, and details are not described herein again.

Figure 11:
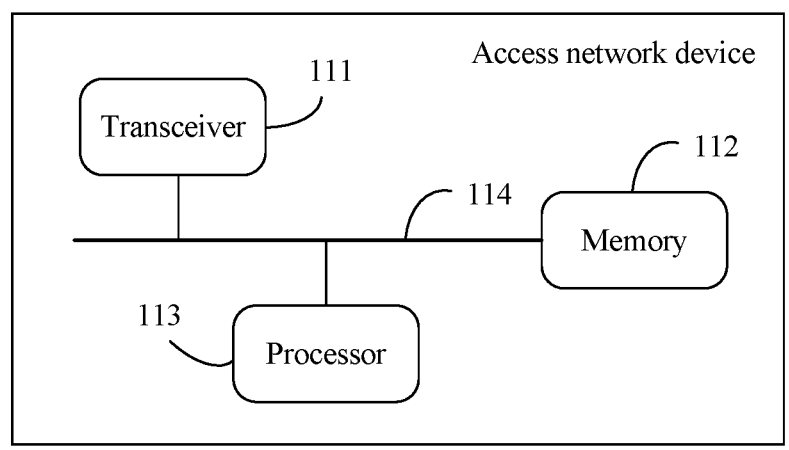
FIG. 11 is another schematic structural diagram of an access network device according to an embodiment of this application.

FIG. 11 is a schematic structural diagram of an access network device according to an embodiment of this application. As shown in FIG. 11, the access network device includes a transceiver 111, a memory 112, a processor 113, and at least one communications bus 114.

The memory 112 stores a software program, the memory 112 may include a high-speed RAM memory, or a non-volatile memory NVM, for example, at least one magnetic memory, and the memory 112 may store various programs to implement various processing functions and implement steps of a method in this embodiment. The processor 113 is coupled to the memory 112, and the communications bus 114 is configured to implement communication connection between elements. Optionally, the transceiver 111 in this embodiment may be a radio frequency module or a baseband module of the access network device.

In this embodiment, the processor 113 runs the software program in the memory 112 to implement the corresponding function in the QoS flow processing method.

Specifically, the transceiver 111 is configured to send a message used for a service transfer request to a second access network device, where the message used for the service transfer request includes configuration information of a QoS flow, and the configuration information includes at least one of the following: first indication information, where the first indication information indicates a QoS rule reflective characteristic of the QoS flow; second indication information, where the second indication information indicates a first manner in which the access network device obtains the QoS rule reflective characteristic of the QoS flow; third indication information, where the third indication information indicates a second manner in which the access network device notifies user equipment UE of the QoS rule reflective characteristic of the QoS flow; fourth indication information, where the fourth indication information indicates a first mapping relationship that is from the QoS flow to a data radio bearer DRB of the access network device and that is used when the UE sends the QoS flow to the access network device; fifth indication information, where the fifth indication information indicates that a manner in which the access network device configures the first mapping relationship for the UE is a user plane configuration manner or a control plane configuration manner; sixth indication information, where the sixth indication information indicates priorities that are between the user plane configuration manner and the control plane configuration manner and that are set by the access network device for the UE; seventh indication information, where the seventh indication information indicates that the UE is to release the mapping relationship that is from the QoS flow to the DRB of the access network device and that is configured by the access network device in the user plane configuration manner; or eighth indication information, where the eighth indication information indicates a reflective characteristic of the DRB of the access network device; receive a message that is used to respond to the service transfer request, where the message includes a mapping relationship configured by the second access network device for the UE and is sent by the second access network device; and send, to the UE, a message that is used to indicate service transfer and that includes the mapping relationship configured by the second access network device for the UE, where the message used to indicate the service transfer instructs the UE to map, based on the indication message, the QoS flow of at least one service to a DRB of the second access network device for transmission.

In actual application, the first manner may be: obtaining the QoS rule reflective characteristic of the QoS flow by using control signaling between the access network device and a core network; or may be: obtaining the QoS rule reflective characteristic of the QoS flow by using indication information included in a downlink user data packet between the access network device and the core network.

In actual application, the second manner may be: notifying the UE of the QoS rule reflective characteristic of the QoS flow by including indication information in a downlink data packet; or may be: notifying the UE of the QoS rule reflective characteristic of the QoS flow by using a user plane control data unit.

In actual application, the user plane configuration manner may be: configuring the mapping relationship from the QoS flow to the DRB for the UE by using indication information included in a downlink data packet, or configuring the mapping relationship from the QoS flow to the DRB for the UE by using a user plane control data unit; and the control plane configuration manner may be: configuring the mapping relationship from the QoS flow to the DRB for the UE by using radio resource control RRC signaling.

In actual application, the transceiver 111 may be further configured to send, to the second access network device, a packet data convergence protocol sequence number PDCP SN status report for the DRB of the access network device to which the QoS flow is mapped, where the PDCP SN status report includes the first indication information.

In actual application, the transceiver 111 may be further configured to send, to the second access network device, a downlink data packet that needs to be forwarded, where an encapsulation header of the downlink data packet that needs to be forwarded includes the first indication information.

The access network device provided in this embodiment of this application may perform the method embodiments. Implementation principles and technical effects thereof are similar, and details are not described herein again.

In addition, an embodiment of this application further provides a plurality of communications system.

A first communications system includes the access network device that includes the QoS flow processing device provided in the embodiment shown in FIG. 8, the access network device that includes the QoS flow processing device provided in the embodiment shown in FIG. 9, and UE.

A second communications system includes the access network device provided in the embodiment shown in FIG. 10, the access network device provided in the embodiment shown in FIG. 11, and UE.

The methods or algorithm steps described with reference to the content disclosed in this application may be implemented by hardware, may be implemented by a processor by executing a software instruction, or may be implemented by using a computer program product. The software instruction may include a corresponding software module. The software module may be stored in a RAM memory, a flash memory, a ROM memory, an EPROM memory, an EEPROM memory, a register, a hard disk, a removable hard disk, a CD-ROM memory, or a storage medium in any other forms well-known in the art. A storage medium used as an example is coupled to the processor, so that the processor can read information from the storage medium, and can write information into the storage medium. Certainly, the storage medium may be a part of the processor. The processor and the storage medium may be located in an ASIC. In addition, the ASIC may be located in user equipment. Certainly, the processor and the storage medium may exist as discrete components in the user equipment.

A person of skill in the art should be aware that in one or more of the foregoing examples, the functions described in this application may be implemented by using hardware, software, firmware, or any combination thereof. When this application is implemented by software, these functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general or dedicated computer.

In the embodiments of the present invention, the disclosed system, device and method may be implemented in other modes without departing from the scope of the present invention. For example, the described embodiment is merely an example. For example, the module or unit division is merely logical function division and may be other division in actual implementation. For example, a plurality of units or components may be combined or integrated into another system, or some features may be ignored or not performed. The units described as separate parts may or may not be physically separate, and parts displayed as units may or may not be physical units, may be located in one position, or may be distributed on a plurality of network units. Some or all of the modules may be selected according to actual needs to achieve the objectives of the solutions of the embodiments. A person of ordinary skill in the art may understand and implement the embodiments of the present invention without creative efforts.

In addition, the schematic diagrams illustrating the system, device, method and different embodiments may be combined or integrated with other systems, modules, technologies or methods without departing from the scope of the present invention. In addition, the displayed or discussed mutual couplings or direct couplings or communication connection may be implemented through some interfaces. The indirect couplings or communication connections between the devices or units may be implemented in electronic, mechanic, or other forms.

It may be understood that, "a plurality of" in the embodiments of this application refers to two or more than two. Descriptions such as "first" and "second" in the embodiments of this application are merely used for indicating and distinguishing between objects, do not show a sequence, do not represent that the embodiments of this application limit a quantity of devices, and do not constitute any limitation to the embodiments of this application.

What is claimed is:

1. A communication processing method, the method comprising:
    receiving, by a terminal device a user plane data packet from a radio access network (RAN) device, indicating a second mapping from a quality of service (QoS) flow to a second data radio bearer (DRB);
    determining, by a protocol layer entity of the terminal device, a change of a first mapping from the QoS flow to a first data radio bearer (DRB) to the second mapping from the QoS flow to the second DRB, wherein the protocol layer entity is above a packet data convergence protocol (PDCP) layer of the terminal device;
    in response to the change of the first mapping from the QoS flow to the first DRB to the second mapping from the QoS flow to the second DRB, generating, by the protocol layer entity above the PDCP layer of the terminal device, an end marker, wherein the end marker indicates ending of sending a data packet of the QoS flow on the first DRB;
    sending, by the protocol layer entity of the terminal device, the end marker on the first DRB over an air interface to the RAN device, wherein the end marker is sent in a form of a user plane control protocol data unit (PDU), and the user plane control PDU carries an identity of the QoS flow mapped to the first DRB; and
    after sending the end marker, starting to send, by the protocol layer entity of the terminal device, a data packet of the QoS flow on the second DRB over the air interface to the RAN device.

2. The method according to claim 1, wherein the second mapping from the flow to the second DRB is received in radio resource control (RRC) configuration, and wherein determining the change of the first mapping from the QoS flow to the first DRB to the second mapping from the QoS flow to the second DRB comprises:
    determining, based on the RRC configuration, a change of the first mapping from the QoS flow to the first DRB to the second mapping from the QoS flow to the second DRB.

3. The communication processing method according to claim 1, wherein the protocol layer entity is packet data association protocol (PDAP) entity.

4. The communication processing method according to claim 1, wherein the QoS flow indicates a plurality of data flows having a same QoS requirement in one PDU session.

5. A terminal device, comprising at least one processor, and non-transitory storage coupled to the at least one processor and having processor-executable instructions stored thereon, which when executed, following operations are implemented:
    receiving, a user plane data packet from a radio access network (RAN) device, indicating a second mapping from a quality of service (QoS) flow to a second data radio bearer (DRB);
    determining, by a protocol layer entity of the terminal device, a change of a first mapping from a the QoS flow to a first data radio bearer (DRB) to the second mapping from the QoS flow to the second DRB, wherein the protocol layer entity is above a packet data convergence protocol (PDCP) layer of the terminal device;
    in response to the change of the first mapping from the QoS flow to the first DRB to the second mapping from the QoS flow to the second DRB, generating, by the protocol layer entity of the terminal device, an end marker, wherein the end marker indicates ending of sending a data packet of the QoS flow on the first DRB;
    sending, by the protocol layer entity of the terminal device, the end marker on the first DRB over an air interface to the RAN device, wherein the end marker is sent in a form of a user plane control protocol data unit (PDU), and the user plane control PDU carries an identity of the QoS flow mapped to the first DRB; and after the end marker is sent, starting to send, by the protocol layer entity of the terminal device, a data packet of the QoS flow on the second DRB over the air interface to the RAN device.

6. The terminal device according to claim 5, wherein the second mapping from the flow to the second DRB is received in radio resource control (RRC) configuration, and wherein determining the change of the first mapping from the QoS flow to the first DRB to the second mapping from the QoS flow to the second DRB comprises:

determining, based on the RRC configuration, a change of the first mapping from the QoS flow to the first DRB to the second mapping from the QoS flow to the second DRB.

7. The terminal device according to claim 5, wherein the QoS flow indicates a plurality of data flows having a same QoS requirement in one PDU session.

8. The terminal device according to claim 5, wherein the protocol layer entity is packet data association protocol (PDAP) entity.

9. A non-transitory computer readable storage medium, wherein the computer readable storage medium stores a computer program, wherein when the computer program is executed by a computer, the computer performs operations comprising:

receiving, by a terminal device a user plane data packet from a radio access network (RAN) device, indicating a second mapping from a quality of service (QoS) flow to a second data radio bearer (DRB);

determining, by a protocol layer entity of the terminal device, a change of a first mapping from the QoS flow to a first data radio bearer (DRB) to the second mapping from the QoS flow to the second DRB, wherein the protocol layer entity is above a packet data convergence protocol (PDCP) layer of the terminal device;

in response to the change of the first mapping from the QoS flow to the first DRB to the second mapping from the QoS flow to the second DRB, generating, by the protocol layer entity of the terminal device, an end marker, wherein the end marker indicates ending of sending a data packet of the QoS flow on the first DRB;

sending, by the protocol layer entity of the terminal device, the end marker on the first DRB over an air interface to the RAN device, wherein the end marker is sent in a form of a user plane control protocol data unit (PDU), and the user plane control PDU carries an identity of the QoS flow mapped to the first DRB; and after sending the end marker, starting to send, by the protocol layer entity of the terminal device, a data packet of the QoS flow on the second DRB over the air interface to the RAN device.

10. The non-transitory computer readable storage medium according to claim 9, wherein the second mapping from the flow to the second DRB is received in radio resource control (RRC) configuration, and wherein determining the change of the first mapping from the QoS flow to the first DRB to the second mapping from the QoS flow to the second DRB comprises:

determining, based on the RRC configuration, a change of the first mapping from the QoS flow to the first DRB to the second mapping from the QoS flow to the second DRB.

11. The non-transitory computer readable storage medium according to claim 9, wherein the QoS flow indicates a plurality of data flows having a same QoS requirement in one PDU session.

12. The non-transitory computer readable storage medium according to claim 9, wherein the protocol layer entity is packet data association protocol (PDAP) entity.

13. A communication apparatus, comprising:

at least one processor configured to:
receive, from a radio access network (RAN) device, a user plane data packet indicating a second mapping from a quality of service (QoS) flow to a second data radio bearer (DRB);

determine, by a protocol layer entity of the communication apparatus, a change of a first mapping from the QoS flow to a first data radio bearer (DRB) to the second mapping from the QoS flow to the second DRB, wherein the protocol layer entity is above a packet data convergence protocol (PDCP) layer of the communication apparatus;

in response to the change of the first mapping from the QoS flow to the first DRB to the second mapping from the QoS flow to the second DRB, generate, by the protocol layer entity of the communication apparatus, an end marker, wherein the end marker indicates ending of sending a data packet of the QoS flow on the first DRB;

send, by the protocol layer entity of the communication apparatus, the end marker on the first DRB over an air interface to the RAN device, wherein the end marker is sent in a form of a user plane control protocol data unit (PDU), and the user plane control PDU carries an identity of the QoS flow mapped to the first DRB; and after the end marker is sent, starting to send, by the protocol layer entity of the communication apparatus, a data packet of the QoS flow on the second DRB over the air interface to the RAN device.

14. The communication apparatus according to claim 13, wherein the second mapping from the flow to the second DRB is received in radio resource control (RRC) configuration, and wherein determining the change of the first mapping from the QoS flow to the first DRB to the second mapping from the QoS flow to the second DRB comprises:

determining, based on the RRC configuration, a change of the first mapping from the QoS flow to the first DRB to the second mapping from the QoS flow to the second DRB.

15. The communication apparatus according to claim 13, wherein the QoS flow indicates a plurality of data flows having a same QoS requirement in one PDU session.

16. The communication apparatus according to claim 13, wherein the protocol layer entity is packet data association protocol (PDAP) entity.

* * * * *

UNITED STATES PATENT AND TRADEMARK OFFICE
CERTIFICATE OF CORRECTION

| | | |
|---|---|---|
| PATENT NO. | : 12,015,949 B2 | |
| APPLICATION NO. | : 16/530025 | |
| DATED | : June 18, 2024 | |
| INVENTOR(S) | : Lifeng Han and Qinghai Zeng | |

It is certified that error appears in the above-identified patent and that said Letters Patent is hereby corrected as shown below:

In the Claims

In Column 44, In Line 53, In Claim 5, delete "a the" and insert -- the --.

Signed and Sealed this
Fifth Day of November, 2024

Katherine Kelly Vidal
*Director of the United States Patent and Trademark Office*